US009444962B2

(12) United States Patent
Aso

(10) Patent No.: US 9,444,962 B2
(45) Date of Patent: Sep. 13, 2016

(54) INFORMATION PROCESSING APPARATUS, INFORMATION PROCESSING METHOD AND NON-TRANSITORY COMPUTER READABLE INFORMATION RECORDING MEDIUM

(71) Applicant: Takahiro Aso, Tokyo (JP)

(72) Inventor: Takahiro Aso, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/499,824

(22) Filed: Sep. 29, 2014

(65) Prior Publication Data

US 2015/0138581 A1 May 21, 2015

(30) Foreign Application Priority Data

Nov. 18, 2013 (JP) ................................ 2013-237750
Apr. 22, 2014 (JP) ................................ 2014-088076

(51) Int. Cl.

| | |
|---|---|
| ***G06F 15/00*** | (2006.01) |
| ***H04N 1/00*** | (2006.01) |
| ***G06F 1/32*** | (2006.01) |
| ***H04N 1/44*** | (2006.01) |
| ***G06F 3/12*** | (2006.01) |

(52) U.S. Cl.

CPC ........ *H04N 1/00896* (2013.01); *G06F 1/3206* (2013.01); *G06F 3/1221* (2013.01); *G06F 3/1239* (2013.01); *G06F 3/1285* (2013.01); *G06F 3/1292* (2013.01); *H04N 1/00408* (2013.01); *H04N 1/4433* (2013.01); *H04N 2201/0094* (2013.01); *Y02B 60/1271* (2013.01)

(58) Field of Classification Search

None
See application file for complete search history.

(56) References Cited

U.S. PATENT DOCUMENTS

2007/0035767 A1* 2/2007 Numata ...................... 358/1.15
2007/0101153 A1 5/2007 Kawaji
2008/0130042 A1* 6/2008 Iizuka et al. ................ 358/1.15
2010/0238495 A1* 9/2010 Sugimoto ............ G06F 21/608 358/1.15
2011/0199646 A1* 8/2011 Homma ...................... 358/1.15
2013/0244615 A1* 9/2013 Miller ........................... 455/411
2014/0092417 A1* 4/2014 Kuroishi et al. ............ 358/1.14

FOREIGN PATENT DOCUMENTS

JP 2007-122384 5/2007
JP 2010-128801 6/2010
JP 2010-135993 6/2010

* cited by examiner

*Primary Examiner* — Helen Q Zong
(74) *Attorney, Agent, or Firm* — Harness, Dickey & Pierce, P.L.C.

(57) ABSTRACT

An information processing unit determines, when receiving information through a reading process from a recording medium, whether a user identified by the information has transition authority for a transition from an energy saving mode to a normal mode of carrying out information processing; sends a transition request for carrying out a transition from the energy saving mode to the normal mode to a power supply control part when determining that the user has the transition authority; and carries out the transition to the normal mode in response to the transition request and, when authentication of the user is successful, displays on a user interface part a display screen page for receiving an operation concerning the information processing.

10 Claims, 16 Drawing Sheets

| No. | USER ID | GROUP ID | RETURNABLE? |
|---|---|---|---|
| 1 | ID0001 | A | ○ |
| 2 | ID0002 | A | ○ |
| 3 | ID0005 | A | ○ |
| 4 | ID5001 | B | × |
| 5 | ID0008 | A | ○ |
| 6 | ID0009 | A | ○ |
| 7 | ID0011 | A | ○ |
| 8 | ID5002 | B | × |
| 9 | ID0012 | A | ○ |
| 10 | ID0013 | A | ○ |
| 11 | ID5004 | B | × |
| 12 | ID0021 | A | ○ |
| | | | |

| No. | USER ID | USABLE? | | | | | SCREEN PAGE |
|---|---|---|---|---|---|---|---|
| | | | COPY | FAC-SIMILE | PRINT-ER | SCAN-NER | |
| 1 | ID0001 | ○ | ○ | ○ | ○ | ○ | D001 |
| 2 | ID0002 | ○ | ○ | × | ○ | ○ | D002 |
| 3 | ID0005 | ○ | ○ | ○ | ○ | ○ | D001 |
| 4 | ID5001 | × | × | × | × | × | × |
| 5 | ID0008 | ○ | ○ | ○ | × | ○ | D003 |
| 6 | ID0009 | ○ | ○ | ○ | ○ | ○ | D001 |
| 7 | ID0011 | ○ | ○ | × | ○ | ○ | D002 |
| 8 | ID5002 | × | × | × | × | × | × |
| 9 | ID0012 | ○ | ○ | ○ | ○ | ○ | D001 |
| 10 | ID0013 | ○ | ○ | × | ○ | ○ | D002 |
| 11 | ID5004 | × | × | × | × | × | × |
| 12 | ID0021 | ○ | ○ | × | ○ | ○ | D002 |
| | | | | | | | |

INFORMATION PROCESSING APPARATUS, INFORMATION PROCESSING METHOD AND NON-TRANSITORY COMPUTER READABLE INFORMATION RECORDING MEDIUM

BACKGROUND OF THE INVENTION

1. Field of the Invention

The present invention relates to an information processing apparatus, an information processing method and a non-transitory computer readable information recording medium.

2. Description of the Related Art

In the related art, in an image forming apparatus such as a Multifunction Peripheral (MFP), two operation modes are prepared, i.e., an energy saving mode in which the power consumption is reduced and a normal mode in which image processing is carried out. According to the technology, control is carried out such that when image processing is not carried out for a predetermined period of time, the operation mode is changed to the energy saving mode.

Also such a configuration is also proposed to carry out control of, when the operation mode is changed from the energy saving mode to the normal mode, carrying out user authentication and permitting image processing when the user authentication is successful.

Further, as discussed in Japanese Laid-Open Patent Application No. 2007-122384 (Patent Reference No. 1), also such a configuration is proposed that the position of a user is detected based on an Integrated Circuit (IC) card that the user has, and, when it is determined that the user has approached an image forming apparatus, a user authentication screen page is automatically displayed based on information of the IC card. According to Patent Reference No. 1, the user can be free from the need of carrying out operations to cause the image forming apparatus to display the user authentication screen page.

SUMMARY OF THE INVENTION

According to one aspect of the present invention, an information processing unit is connected with a power supply control part that controls a transition between an energy saving mode of reducing power consumption and a normal mode of carrying out information processing and controls a user interface part provided for carrying out an operation concerning the information processing. The information processing unit includes a determination part configured to determine, when receiving information through a reading process from a recording medium, whether a user identified by the information has transition authority for a transition from the energy saving mode to the normal mode; a request part configured to send a transition request for carrying out a transition from the energy saving mode to the normal mode to the power supply control part when the determination part determines that the user has the transition authority; and a display control part configured to carry out the transition to the normal mode in response to the transition request and, when authentication of the user is successful, display on the user interface part a display screen page for receiving an operation concerning the information processing.

Other objects, features and advantages of the present invention will become more apparent from the following detailed description when read in conjunction with the accompanying drawings.

BRIEF DESCRIPTION OF THE DRAWINGS

FIG. 6 illustrates one example of a determination table to be used by an operation part control service of the operation part to carry out a mode transition permission determination process;

FIG. 7 illustrates one example of an authentication table to be used by a user management service of the body part to carry out an authentication process;

DETAILED DESCRIPTION OF THE EMBODIMENTS

Figure 1:
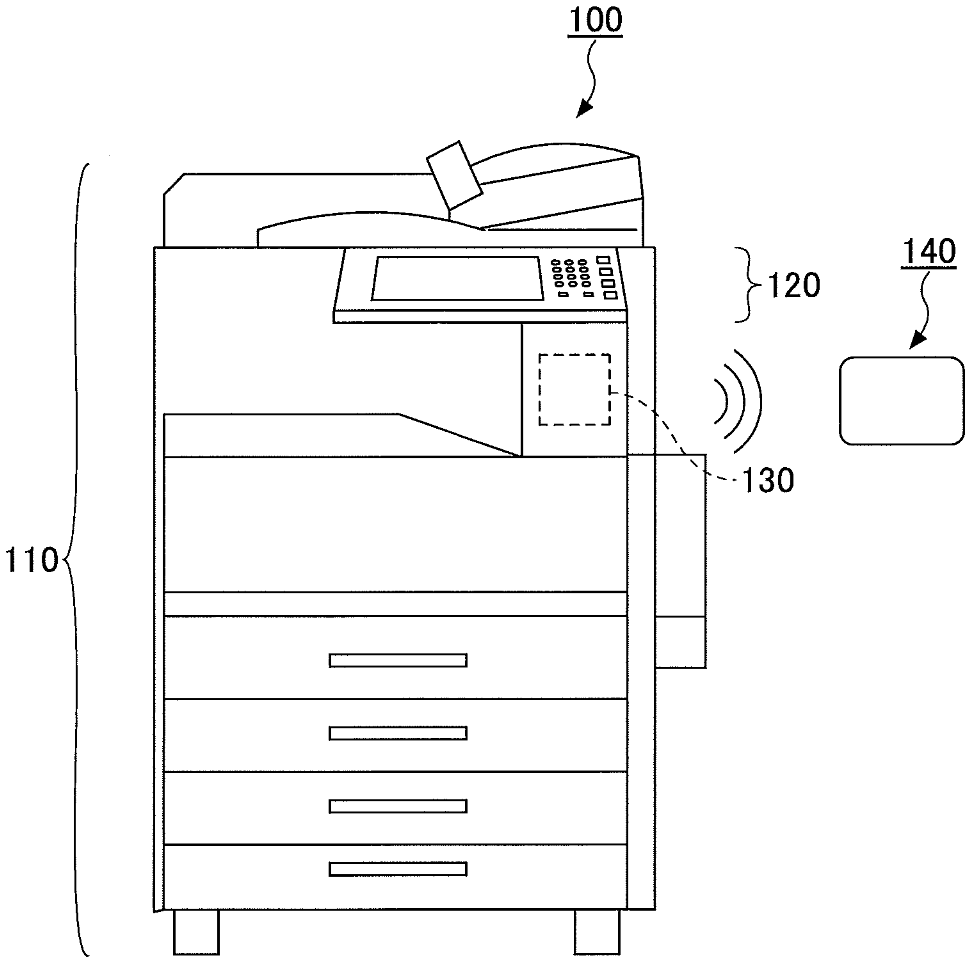
FIG. 1 illustrates an external appearance of an image forming apparatus having an operation part according to an embodiment and an external appearance of an IC card.

In the technology of Patent Reference No. 1, image processing can be started only after an operation of inputting a password and user authentication are carried out in the image forming apparatus. Therefore, when the technology of Patent Reference No. 1 is applied for a transition from the energy saving mode to the normal mode, a certain period of time is required until the user comes to be able to start image processing from when the user approaches the image forming apparatus.

It is possible to immediately start image processing by omitting user authentication. However, in this case, the image forming apparatus changes in its operation mode to the normal mode also when a user who will not (or is not permitted to) use the image forming apparatus approaches the image forming apparatus, and thus, the energy saving effect will be reduced.

Thus, it is demanded to improve convenience in the user's operation while maintaining the energy saving effect in an image forming apparatus such as a MFP.

In the respective embodiments described below, it is possible to improve convenience in the user's operation in an image forming apparatus.

The embodiments of the present invention will now be described using the accompanying drawings. Note that, below, the embodiments will be described for cases where an information processing unit is applied to an operation part of an image forming apparatus such as an MFP. A unit/device/apparatus or so to which an information processing unit according to the present invention is applied is not limited thereto. It is also possible to apply an information processing unit according to the present invention to an element/component of an information processing apparatus other than an operation part such as a body part. Alternatively, it is also possible that the respective elements of an information processing unit according to the present invention are separately mounted/installed in an operation part and a body part of an image forming apparatus. It is also possible to apply an information processing unit according to the present invention to any apparatus other than an image forming apparatus or an element(s) thereof.

For elements/components/parts having substantially the same functional configurations in the specification and the drawings, the same reference numerals are given and duplicate description is omitted.

First Embodiment

<External Appearances of Image Forming Apparatus and IC Card>

An external appearance of an image forming apparatus having an operation part according to the present embodiment and an external appearance of an IC card to be used for user authentication in the image forming apparatus will be described first. FIG. 1 illustrates external appearances of the image forming apparatus 100 having the operation part and the IC card 140 used for user authentication in the image forming apparatus 100.

As shown in FIG. 1, the image forming apparatus 100 includes the body part 110, the operation part 120 and a reading device 130. The body part 110 carries out various sorts of image processing such as a copying process (as in a copier), a facsimile process, a printing process (as in a printer) and a scanning process (as in a scanner) based on various operations of a user performed on the operation part 120.

The operation part 120 is used when a user performs various operations such as selecting a service concerning image processing to be executed by the body part 110, inputting various setting values for carrying out the service concerning image processing, inputting an execution instruction for carrying out the service concerning image processing, and so forth. Further, the operation part 120 displays an internal state(s) of the body part 110. The reading device 130 reads information (i.e., information concerning a user) recorded in a RF-ID tag included in the IC card 140.

The IC card 140 is carried by a user who uses the image forming apparatus 100 and records information concerning the user such as an ID (identification information). One example of such an IC card 140 is an employee ID card that an employee of an office in which the image forming apparatus 100 is installed uses. However, the IC card 140 is not limited thereto, and any recording medium recording information by which a user can be identified can be used as the IC card 140.

The image forming apparatus 100 having the above-mentioned configuration carries out a transition from an energy saving mode when no operation is performed by a user on the operation part 120 for a predetermined period of time. When a user who carries the IC card 140 approaches the image forming apparatus 100, the image forming apparatus 100 carries out a "mode control process" to carry out a transition to a normal mode.

More specifically, when a user approaches the image forming apparatus 100, the image forming apparatus 100 carries out a process up to user authentication based on his or her IC card 140. Then, when the authentication is successful, the image forming apparatus 100 changes its operation mode to the normal mode. Thus, it is possible to improve the user's convenience while maintaining the energy saving effect.

<Hardware Configuration of Body Part of Image Forming Apparatus>

Figure 2:
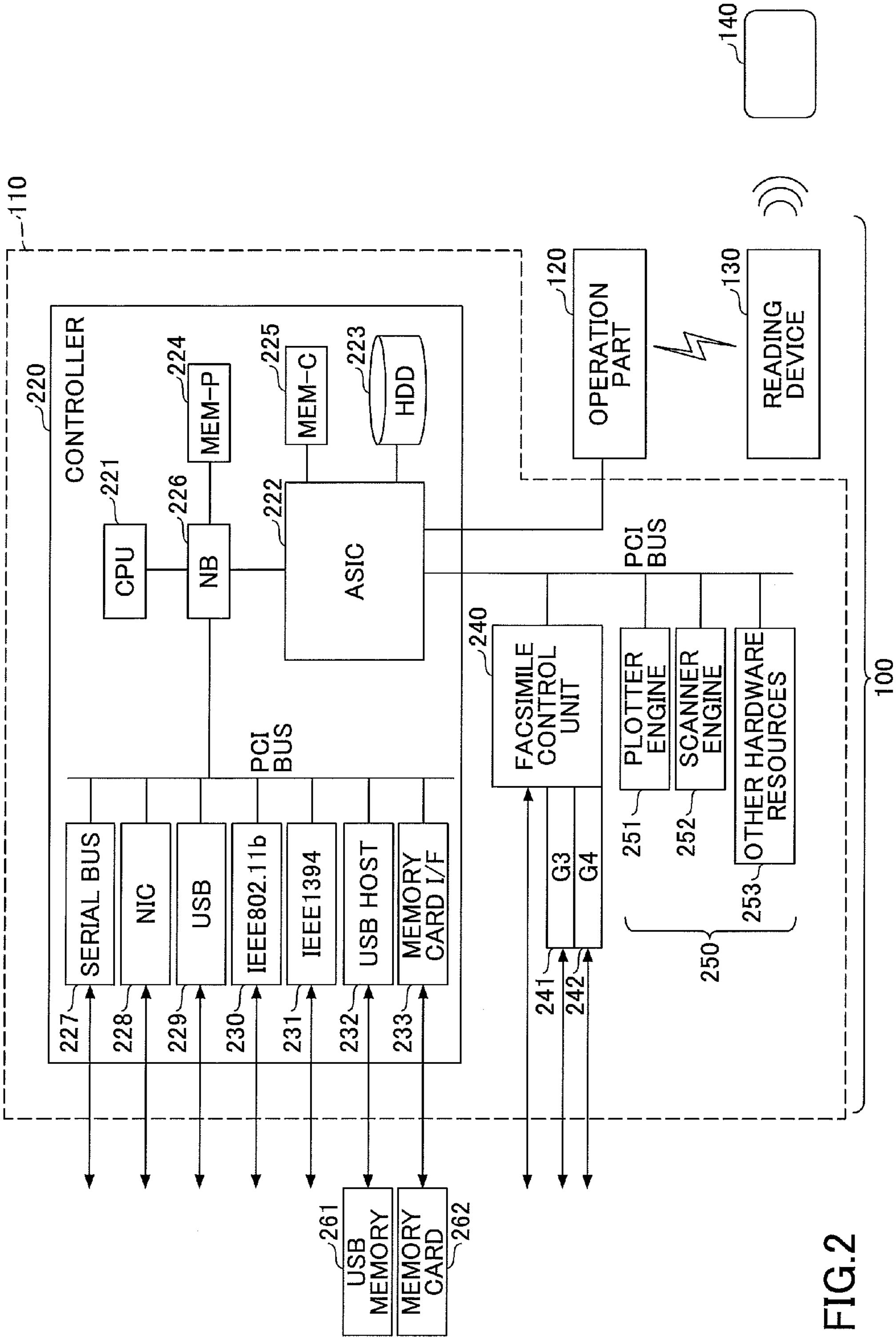
FIG. 2 illustrates a hardware configuration of a body part of the image forming apparatus.

A hardware configuration of the body part 110 of the image forming apparatus 100 will be described. FIG. 2 is a block diagram illustrating a hardware configuration of the body part 110 of the image forming apparatus 100. As described above, the image forming apparatus 100 can be broadly classified into the body part 110, the operation part 120 and the reading device 130. Here, a hardware configuration of the body part 110 will be described first.

The body part 110 includes a controller 220, a facsimile control unit 240 and an engine group 250. The facsimile control unit 240 includes a G3 standard conforming unit 241 and a G4 standard conforming unit 242. The engine group 250 includes a plotter engine 251, a scanner engine 252 and other hardware resources 253.

The controller 220 includes a CPU 221, an ASIC 222, a Hard Disk Drive (HDD) 223, a system memory (MEM-P) 224, a local memory (MEM-C) 225 and a north bridge (NB) 226. The controller 220 further includes a serial bus 227, a Network Interface Card (NIC) 228 and a USB device 229. The controller 220 further includes an IEEE 802.11b device 230, an IEEE 1394 device 231, a USB host device 232 and a memory card I/F 233.

Note that the serial bus 227, the NIC 228, the USB device 229, the IEEE 802.11b device 230, the IEEE 1394 device 231, the USB host 232 and the memory card I/F 233 are connected with the NB 226 via a PCI bus.

In the controller 220, the local memory 225, the HDD 223 and so forth are connected to the ASIC 222. The CPU 221 and the system memory 224 are connected with the ASIC 222 by the NB 226 in a CPU chip set. The facsimile control unit 240 and the engine group 250 are connected with the ASIC 222 by a PCI bus.

The CPU 221 includes a processor(s) controlling the entirety of the image forming apparatus 100. The CPU 221 starts a system control service 421, a facsimile control service 422, an engine control service 423, a memory control service 424 and a network control service 425 described later using FIG. 4A as respective processes on an OS 431 and executes them. The CPU 221 also starts a power supply control service (power supply control part) 426 and a user management service 427 and executes them. The CPU 221 also starts a copy application 411, a facsimile application 412, a printer application 413 and a scanner application 414 included in an application layer 403 and executes them.

The NB 226 is a bridge connecting respective elements. Specifically, the NB 226 connects the CPU 221, the system memory 224, the ASIC 222, the serial bus 227, the NIC 228 and the USB device 229. Also, the NB 226 connects the IEEE 802.11b device 230, the IEEE 1394 device 231, the USB host 232 and the memory card I/F 233.

The system memory 224 is used as a drawing memory and so forth in the image forming apparatus 100. The local memory 225 is used as a copying image buffer, a code buffer and so forth.

The ASIC 222 is an integrated circuit (IC) including hardware elements for image processing. The HDD 223 is a storage storing various information. For example, the HDD

223 stores destination data for facsimile transmission and/or destination data for electronic mails (i.e., address book data) and so forth. The HDD 223 also stores history data such as a transmission history for facsimile transmission, electronic mail transmission and so forth, stored image data and stored document data which are data of print jobs, and so forth. The HDD 223 also stores billing data, an authentication table (described later) for user authentication, various programs, font data, form data, and so forth.

The serial bus 227, the NIC 228, the USB device 229, the IEEE 802.11b device 230, the IEEE 1394 device 231, the USB host 232 and the memory card I/F 233 are respective interfaces for connecting to portable recording media of the corresponding standards. For example, as shown in FIG. 2, a USB memory 261 can be connected to the USB host 232, and a memory card 262 can be connected to the memory card I/F 233.

<Hardware Configuration of Operation Part and Reading Device of Image Forming Apparatus>

Figure 3:
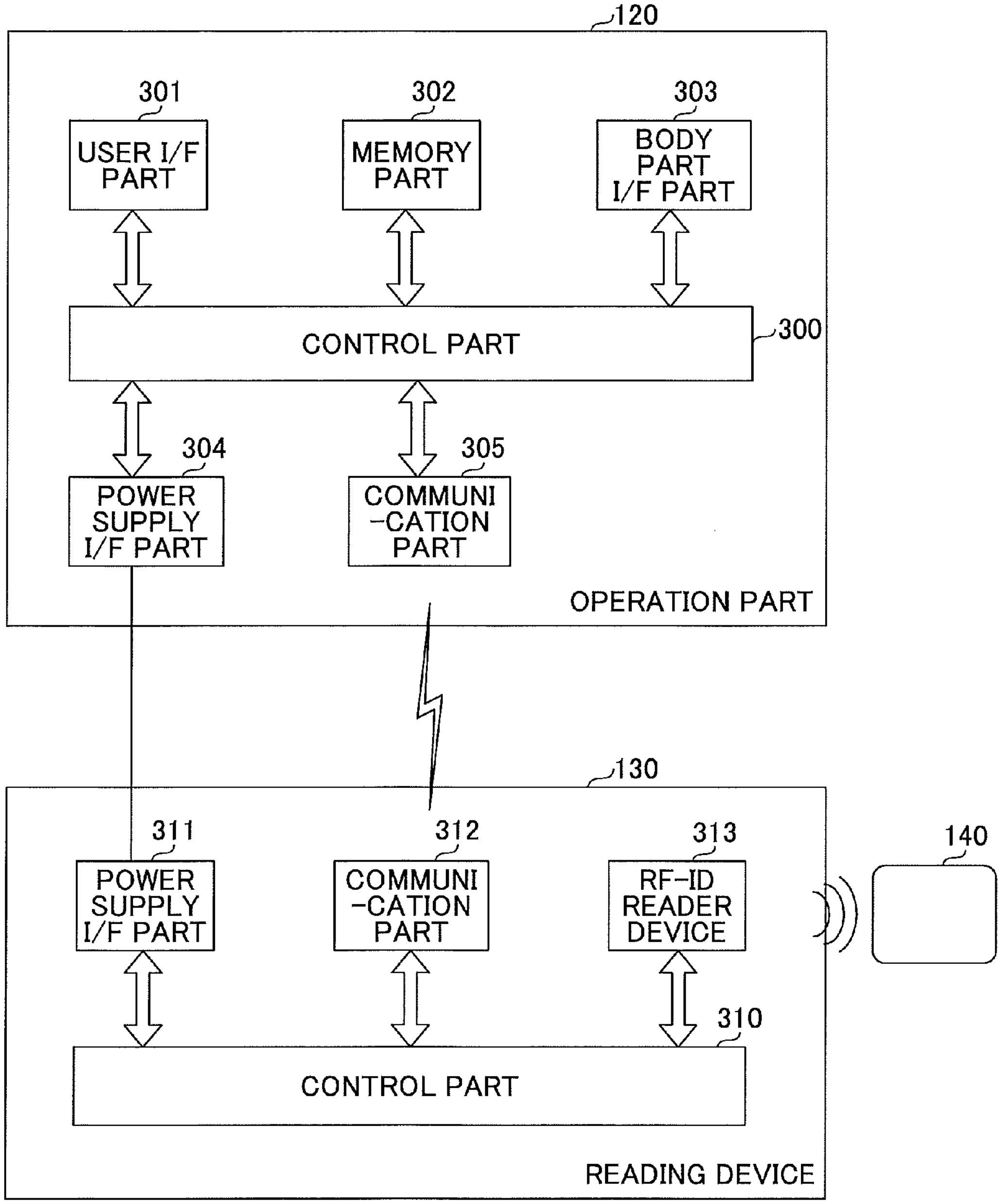
FIG. 3 illustrates hardware configurations of an operation part and a reading device of the image forming apparatus.

Hardware configurations of the operation part 120 and the reading device 130 of the image forming apparatus 100 will now be described. FIG. 3 illustrates hardware configurations of the operation part 120 and the reading device 130 of the image forming apparatus 100.

First, a hardware configuration of the operation part 120 will be described. A control part 300 includes a processor(s) controlling the entirety of the operation part 120. The control part 300 starts a system control service 471, a memory control service 472, a network control service 473, an operation part control service 474 and an authentication management service 475 described later using FIG. 4B as respective processes on an OS 480 and executes them. Also the control part 300 starts an operation application 461 included in an application layer 453 and executes it.

A user interface part 301 includes a LCD device, a touch panel, hard keys and/or the like. The user interface part 301 is used when a user performs various operations such as selecting a service concerning image processing to be executed by the body part 110, inputting various setting values for carrying out the service concerning image processing, inputting an execution instruction for carrying out the service concerning image processing and so forth. Note that the control part 300 displays and controls a display screen page displayed on the LCD device 501 (described later using FIG. 5B) of the user interface part 301. Also the control part 300 controls turning on and off a backlight 503 included in the LCD device 501.

A memory part 302 is used as a work memory when the control part 300 carries out a process in the operation part 120. The memory part 302 also functions as a storage device for storing a determination table to be used for a "mode transition permission determination process" described later, data transferred from the HDD 223 of the body part 110 of the image forming apparatus 100, and so forth.

A body part interface part 303 is an interface for transmission/reception of signals between the operation part 120 and the body part 110. The signals based on various operations performed by a user on the user interface part 301 are transmitted to the body part 110 via the body part interface part 303. Also signals indicating internal states of the body part 110 are transmitted to the operation part 120 via the body part interface part 303 and these states are displayed on the user interface part 301.

Note that the body part interface part 303 can be electric contacts, a Universal Serial Bus (USB) interface, an infrared communication part or so. In other words, regardless of whether the body part 110 and the operation part 120 are physically connected or not, the body part 110 can carry out services concerning image processing based on various operations by a user performed on the operation part 120.

A power supply interface part 304 is an interface for connecting a power supply cable for supplying the power to the reading device 130. A communication part 305 carries out wireless communication with the reading device 130. The operation part 120 transmits an instruction to start reading, an instruction to terminate reading or so to the reading device 130 via the communication part 305, or receives information concerning a user such as an ID of the user from the reading device 130 via the communication part 305.

Next, a hardware configuration of the reading device 130 will be described. A control part 310 includes a processor(s) controlling the entirety of the reading device 130. A power supply interface part 311 is an interface on the side of the reading device 130 for connecting the power supply cable for supplying the power to the reading device 130. The power supplied via the power supply interface part 311 is supplied to the control part 310 and is distributed to a communication part 312 and a RF-ID reader device 313.

The communication part 312 carries out wireless communication with the operation part 120, receives from the operation part 120 an instruction to start reading or an instruction to terminate reading and transmits information concerning a user such as an ID of the user.

The RF-ID reader device 313 reads from an IC card 140 information concerning a user recorded in its RF-ID tag and transmits the information to the operation part 120 via the communication part 312. The information concerning the user recorded in the RF-ID tag includes an ID of the user (user identification information (user ID)) and an ID of the group to which the user belongs (group identification information (group ID)). The RF-ID reader device 313 transmits to the operation part 120 the information concerning the user (the user ID and the group ID), and also, information concerning the signal strength when the IDs are thus read.

<Functional Configuration of Body Part and Operation Part of Image Forming Apparatus>

Figure 4A:
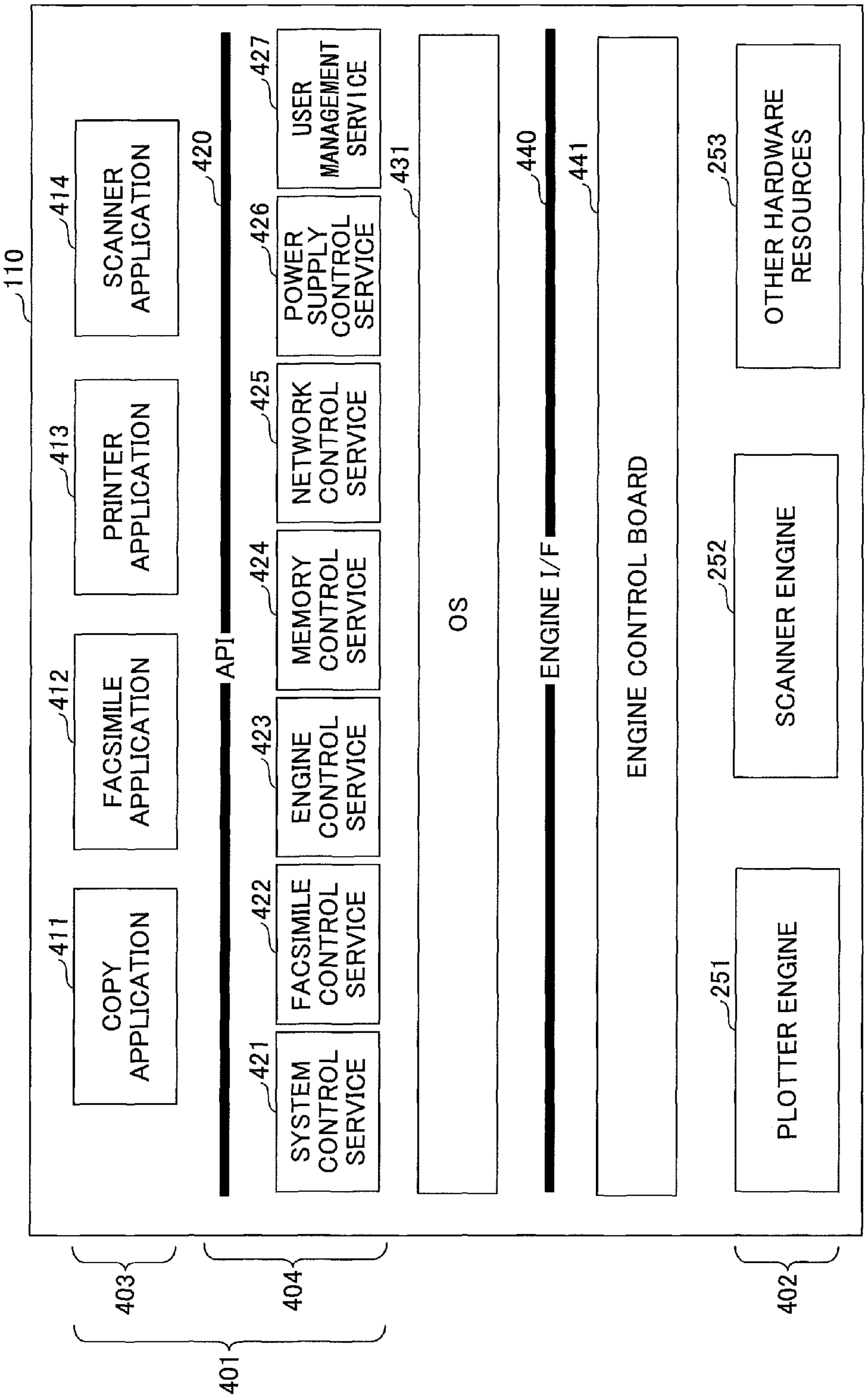
FIGS. 4A and 4B illustrate functional configurations of the body part and the operation part of the image forming apparatus.
Figure 4B:
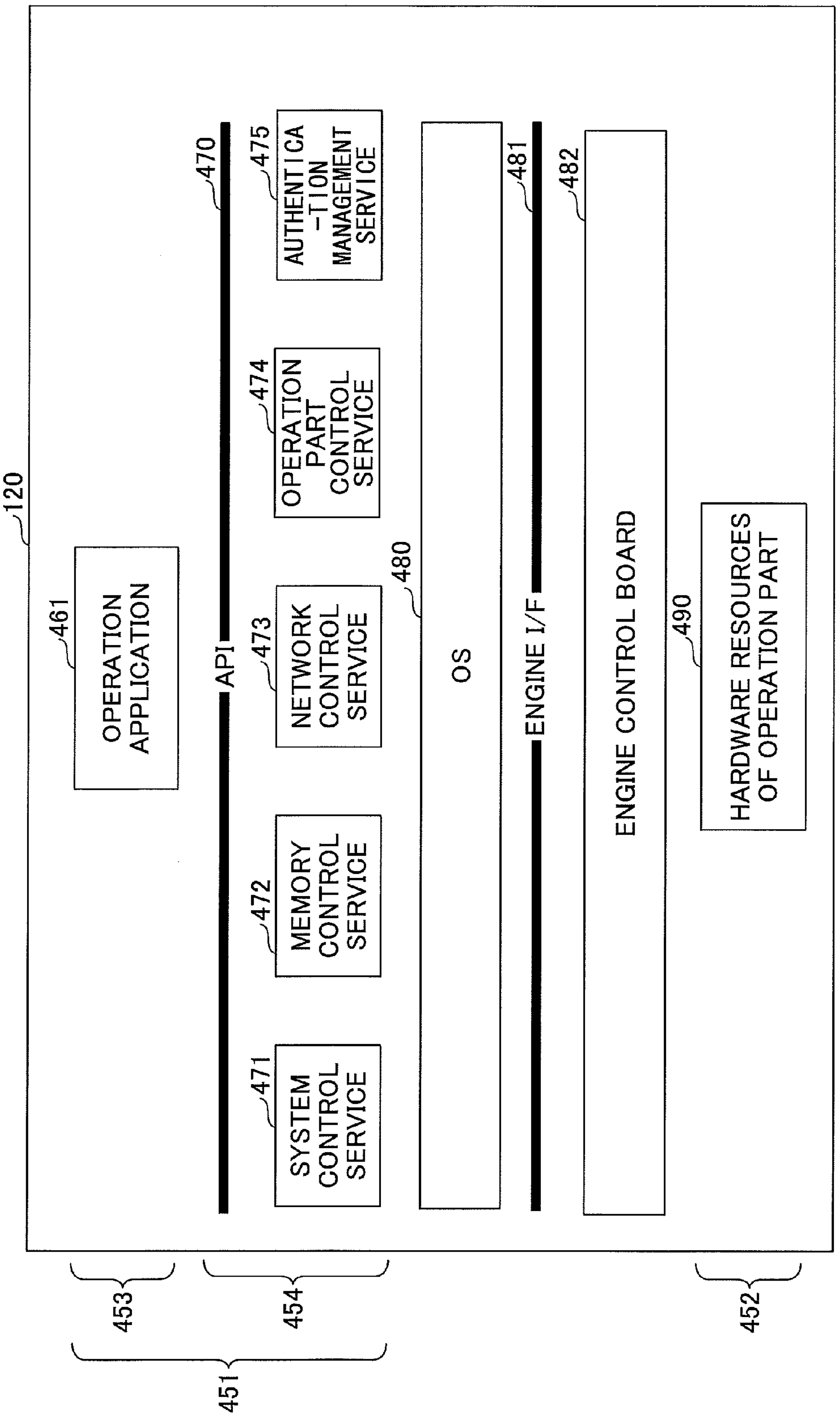

Next, functional configurations of the body part 110 and the operation part 120 of the image forming apparatus 100 will be described. FIGS. 4A and 4B illustrate functional configurations of the body part 110 and the operation part 120 of the image forming apparatus 100. According to the present embodiment, in the image forming apparatus 100, respective CPUs are provided to the body part 110 and the operation part 120. Under the respective Operation Systems (OSs), various platforms and various applications are executed. Below, a functional configuration of the body part 110 and a functional configuration of the operation part 120 will be described separately.

(Functional Configuration of Body Part 110)

First, a functional configuration of the body part 110 will be described. As shown in FIG. 4A, the body part 110 of the image forming apparatus 100 includes a software group 401 and hardware resources 402.

The software group 401 includes the application layer 403 and a platform layer 404 generating acquisition requests for the hardware resources 402 by interpreting process requests provided by the application layer 403.

The application layer 403 includes respective unique programs for providing services concerning image processing such as copying (copy), facsimile communications, printing (printer) and scanning (scanner). The application layer 403 shown in FIG. 4A includes, for example, the copy application 411 for copying and the facsimile application 412 for facsimile. Also, The application layer 403 shown in FIG. 4A includes, for example, the printer application 413 for printing and the scanner application 414 for scanning.

The platform layer 404 generates acquisition requests for acquiring the hardware resources 402 by interpreting process requests from the respective applications of the application layer 403, manages the thus acquired hardware resources 402 and so forth. The platform layer 404 shown in FIG. 4A includes, for example, the system control service 421 and the facsimile control service 422. The platform layer 404 shown in FIG. 4A also includes, for example, the engine control service 423, the memory control service 424 and the network control service 425. The platform layer 404 shown in FIG. 4A further includes, for example, the power supply control service 426 and the user management service 427.

Thereamong, the system control service 421 to the network control service 425 are the same as those included in a platform layer of a body part of a common image forming apparatus and therefore description thereof is omitted.

The power supply control service 426 carries out a control process of switching between an energy saving mode of reducing the power consumption and a normal mode of carrying out image processing. Specifically, the power supply control service 426 carries out a control process to turn off the power supply to some of the hardware resources 402 to cause the image forming apparatus 100 to enter a sleep state when switching to the energy saving mode. When switching to the normal mode, the power supply control service 426 carries out a control process to cause the power supply thus turned off to be returned to cause the image forming apparatus 100 to enter an idle state.

The user management service 427 manages the authentication table (described later) for user authentication and also carries out an authentication process for a user.

Details of processes of the power supply control service 426 and the user management service 427 will be described later. Note that the power supply control service 426 can be incorporated into the system control service 421 and a process of the power supply control service 426 can be executed by the system control service 421.

The platform layer 404 has an Application Program Interface (API) 420 for receiving process requests from the application layer 403 using a previously defined function(s).

The software group 401 is executed on the OS 431. The OS 431 executes the software group 401 including the respective applications of the application layer 403 and the respective services of the platform layer 404 as processes in parallel.

The engine I/F 440 transmits acquisition requests for acquiring the hardware resources 402 via an engine control board 441 using a function(s) previously defined by the software group 401 or so.

The hardware resources 402 of FIG. 4A include, for example, the plotter engine 251, the scanner engine 252 and the other hardware resources 253.

(Functional Configuration of Operation Part 120)

Next, a functional configuration of the operation part 120 will be described. As shown in FIG. 4B, also the operation part 120 of the image forming apparatus 100 includes, the same as the body part 110, a software group 451 and hardware resources 452.

The software group 451 includes the application layer 453 and a platform layer 454 generating acquisition requests for the hardware resources 452 by interpreting process requests provided by the application layer 453.

The application layer 453 includes an operation application 461. The operation application 461 displays a display screen page on the operation part 120 for a user to perform various operations and also acquires the corresponding operation contents when the user performs the operations.

The platform layer 454 generates acquisition requests for acquiring the hardware resources 452 by interpreting process requests from the respective applications of the application layer 453, manages the thus acquired hardware resources 452 and so forth. The platform layer 454 shown in FIG. 4B also includes, for example, the system control service 471, the memory control service 472 and the network control service 473. The platform layer 454 shown in FIG. 4B further includes, for example, the operation part control service 474 and the authentication management service 475.

Thereamong, the system control service 471 to the network control service 473 are merely those included in a platform layer of a body part of a common image forming apparatus being applied for an operation part and therefore description thereof is omitted.

The operation part control service 474 carries out a control process on the operation application 461 to switch between a state where the user is permitted to perform an operation ("operation permitted state") and a state where the user is not permitted to perform an operation ("operation not permitted state"). In addition to the switching between the operation permitted state and the operation not permitted state, the operation part control service 474 carries out a control process of turning on and off the backlight 503 of the user interface part 301 or turning on and off of the power supply to the entirety of the operation part 120. Also, the operation part control service 474 carries out a control process of carrying out a "mode transition permission determination process" in a "mode control process" described later, and also, manages the determination table to be used in the mode transition permission determination process.

The authentication management service 475 manages an authentication process for a user. An authentication process for a user is carried out by the user management service 427 using the authentication table managed by the user management service 427. The authentication management service 475 manages the thus carried out authentication process.

Details of process of the operation part control service 474 and the authentication management service 475 will be described later. The operation part control service 474 can be incorporated into the system control service 471, and a process of the operation part control service 474 can be carried out by the system control service 471.

The platform layer 454 has an Application Program Interface (API) 470 for receiving process requests from the application layer 453 using a previously defined function(s).

The software group 451 is executed on the OS 480. The OS 480 executes the software group 451 including the respective applications of the application layer 453 and the respective services of the platform layer 454 as processes in parallel.

An engine I/F 481 transmits acquisition requests for acquiring the hardware resources 452 (hardware resources 490 of the operation part) using a function(s) previously defined by the software group 401 or so via an engine control board 482.

According to the present embodiment, in order to ensure independency between the body part 110 and the operation part 120 in the image forming apparatus 100, the OS 431 of the body part 110 is different from the OS 480 of the operation part 120. Thus, the body part 110 and the operation part 120 operate by the separate OSs 431 and 480 independently. For example, it is possible that an OS of Linux (registered trademark) is used as the OS of the body part 110 while an OS of Android (registered trademark) is used as the OS of the operation part 120.

Since the body part 110 and the operation part 120 thus operate by the separate OSs in the image forming apparatus 100 according to the present embodiment, communication between the body part 110 and the operation part 120 is carried out not as an inter-process communication within a common apparatus but as communication between separate apparatuses. This communication corresponds to an operation (command communication) of transmitting information (an instruction that is input by a user) received by the operation part 120 to the body part 110, an operation of transmitting a notification of an event from the body part 110 to the operation part 120, or so. Here, the operation part 120 can use a function of the body part 110 by carrying out a command communication for the body part 110. The above-mentioned event included in the notification transmitted from the body part 110 to the operation part 120 can include a state of an operation carried out in the body part 110, the contents that are set in the body part 110, or so.

Further, according to the present embodiment, the power supply to the operation part 120 is carried out through the communication path from the body part 110. Therefore, it is possible to carry out control of the power supply to the operation part 120 separately (independently) from control of the power supply to the body part 110.

<Configuration of User Interface>

Figure 5A:
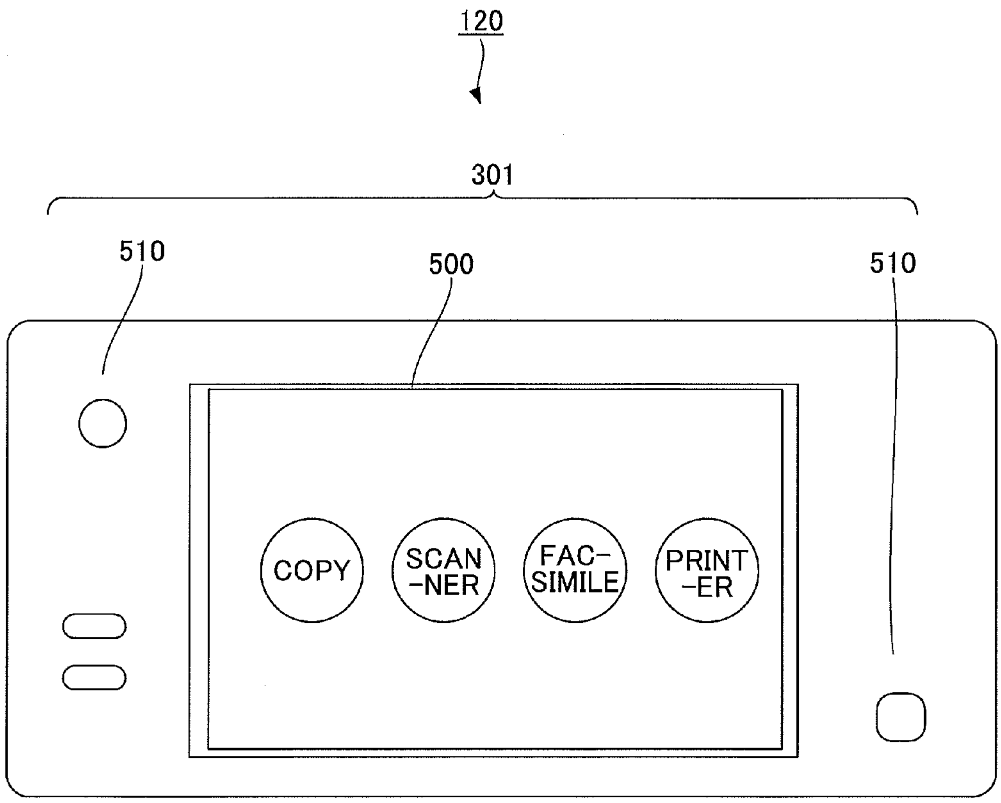
FIG. 5A illustrates an external appearance of the operation part.

Next, an external appearance of the user interface part 301 in the operation part 120 will be described. FIG. 5A illustrates an external appearance of the user interface part 301 in the operation part 120. As shown in FIG. 5A, the user interface part 301 includes a display and input part 500 in which the LCD device 501 and the touch panel are combined and the hard keys 510.

The LCD device 501 included in the display and input part 500 displays display screen pages of the operation application 461. In the example of FIG. 5A, an display screen page for a user to input an instruction to request a service concerning image processing from among those such as "copy" (copying), "scanner" (scanning), "facsimile" (facsimile communications) and "printer" (printing) is displayed. As a result of a user selecting any one of these buttons "copy", "scanner", "facsimile" and "printer" displayed, the touch panel detects the selected position, and the operation application 461 acquires the corresponding instruction contents based on the detected selected position.

Figure 5B:
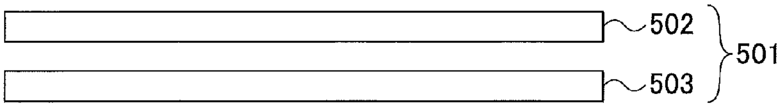
FIG. 5B schematically illustrates a LCD device (of the operation part) including a backlight.

The backlight 503 is provided in the LCD device 501 of the display and input part 500. By turning on the backlight 503, a user can see a display screen page displayed on the display and input part 500. FIG. 5B schematically illustrates the LCD device 501 (of the operation part 120) including a liquid crystal panel 502 and the backlight 503. Note that FIG. 5B is merely for illustrating the fact that the LCD device 501 includes the liquid crystal panel 502 and the backlight 503 as its elements and the actual configuration of the LCD device 501 is not limited thereto.

<Determination Table and Authentication Table>

Next, the determination table managed by the operation part control service 474 of the operation part 120 and used by a "mode transition permission determination process" described later and the authentication table managed by the user management service 427 of the body part 110 and used by an authentication process described later will be described. FIG. 6 illustrates one example of the determination table 600 managed by the operation part control service 474 and used by a "mode transition permission determination process".

As shown in FIG. 6, the determination table 600 registers the user IDs of all the employees of the office in which the image forming apparatus 100 is installed. Also, group IDs for grouping the respective employees are associated. Further, "return permission information" ("returnable?" in FIG. 6) indicating whether each user has return authority (transition authority) for returning from the energy saving mode to the normal mode is also associated.

The "return permission information" corresponds to the group IDs, and each user belonging to a predetermined group (in the example of FIG. 6, the group "A") has the return authority to return to the normal mode. On the other hand, each user belonging to another predetermined group (in the example of FIG. 6, the group "B") does not have the return authority to return to the normal mode.

FIG. 7 illustrates one example of the authentication table 700 managed by the user management service 427 and used by an authentication process.

As shown in FIG. 7, the authentication table 700 registers the user IDs of all the employees of the office in which the image forming apparatus 100 is installed. Also, group IDs for grouping the respective employees are associated. Also, "use permission/non-permission information" indicating whether each user has use authority to use the image forming apparatus 100 is associated. Note that the "use permission/non-permission information" indicates not only use authority for the image forming apparatus 100 itself but also use authority for each service concerning image processing that the image forming apparatus 100 provides, as shown in FIG. 7.

Further, the "use permission/non-permission information" has "screen page information" registered in a manner of being associated therewith. Even when a user's authentication process is successful, since the services usable by each user depends on the user, the "screen page information" is used to display a display screen page selectively indicating only the usable services for the user. As a result, on the display and input part 500, the display screen page suitable for the "use permission/non-permission information" of each user is displayed.

<Modes (or States)>

Next, switching (transition) between the energy saving mode and the normal mode controlled by the power supply control service 426 of the body part 110 and switching (transition) between the operation not permitted state and the operation permitted state controlled by the operation part control service 474 of the operation part 120 will be described.

Figure 8A:
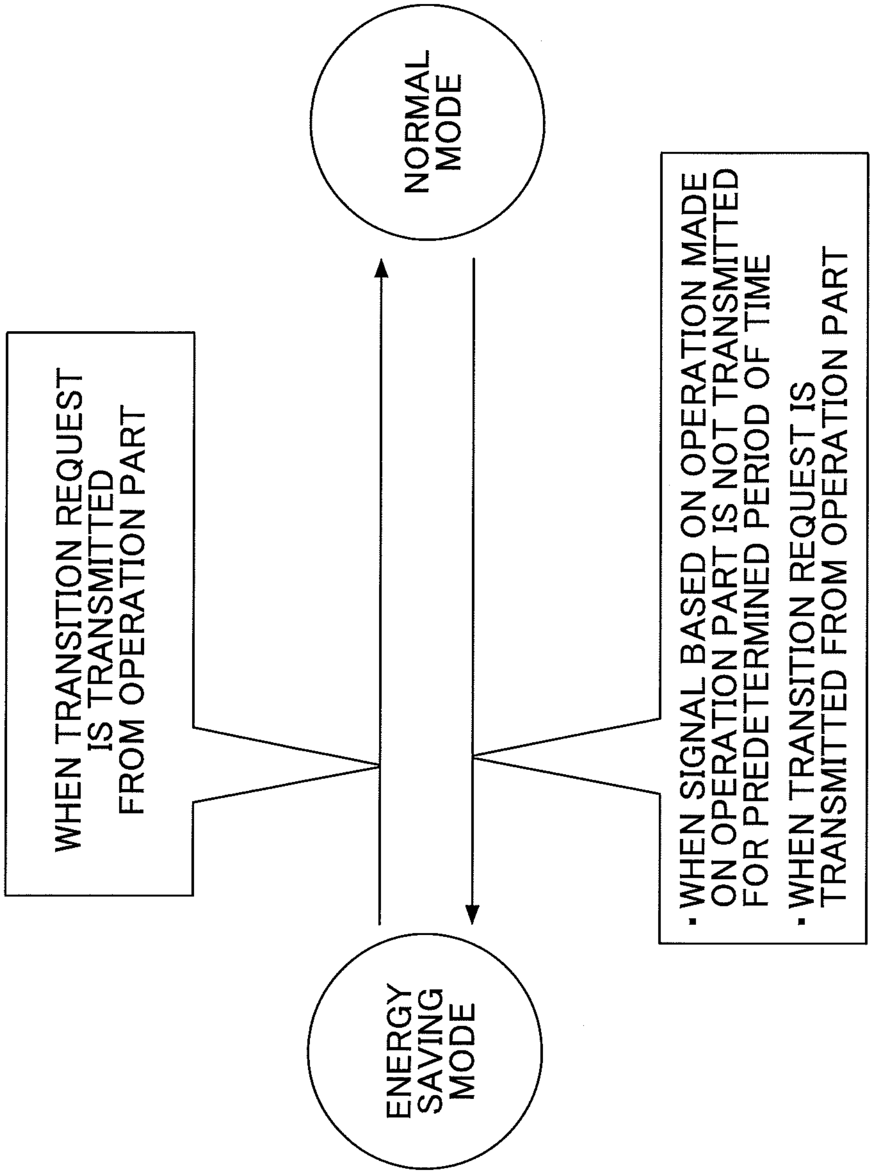
FIGS. 8A and 8B illustrate operation modes/states of the body part and the operation part.

FIG. 8A illustrates switching between the energy saving mode and the normal mode controlled by the power supply control service 426 of the body part 110. As shown in FIG. 8A, a transition from the normal mode to the energy saving mode is carried out when i) none of signals based on various operations performed by a user on the user interface part 301 of the operation part 120 have been transmitted from the operation part 120 to the body part 110 for a predetermined period of time, or ii) a corresponding transition request is transmitted from the operation part 120 to the body part 110.

The body part 110 monitors whether signals based on various operations performed by a user on the user interface part 301 of the operation part 120 have been transmitted from the operation part 120 to the body part 110. Then, when determining that none of the signals have been transmitted from the operation part 120 to the body part 110 for the predetermined period of time, the body part 110 carries out a transition to the energy saving mode. Also, when the operation part 120 determines as a result of carrying out a process that the body part 110 should carry out a transition to the energy saving mode and sends a corresponding transition request to the body part 110, the body part 110 carries out a transition to the energy saving mode.

On the other hand, a transition from the energy saving mode to the normal mode is carried out when a corresponding transition request is transmitted from the operation part 120 to the body part 110. Specifically, when the operation part 120 determines as a result of carrying out a process that the body part 110 should carry out a transition to the normal mode and sends a corresponding transition request to the body part 110, the body part 110 carries out a transition to the normal mode.

Figure 8B:
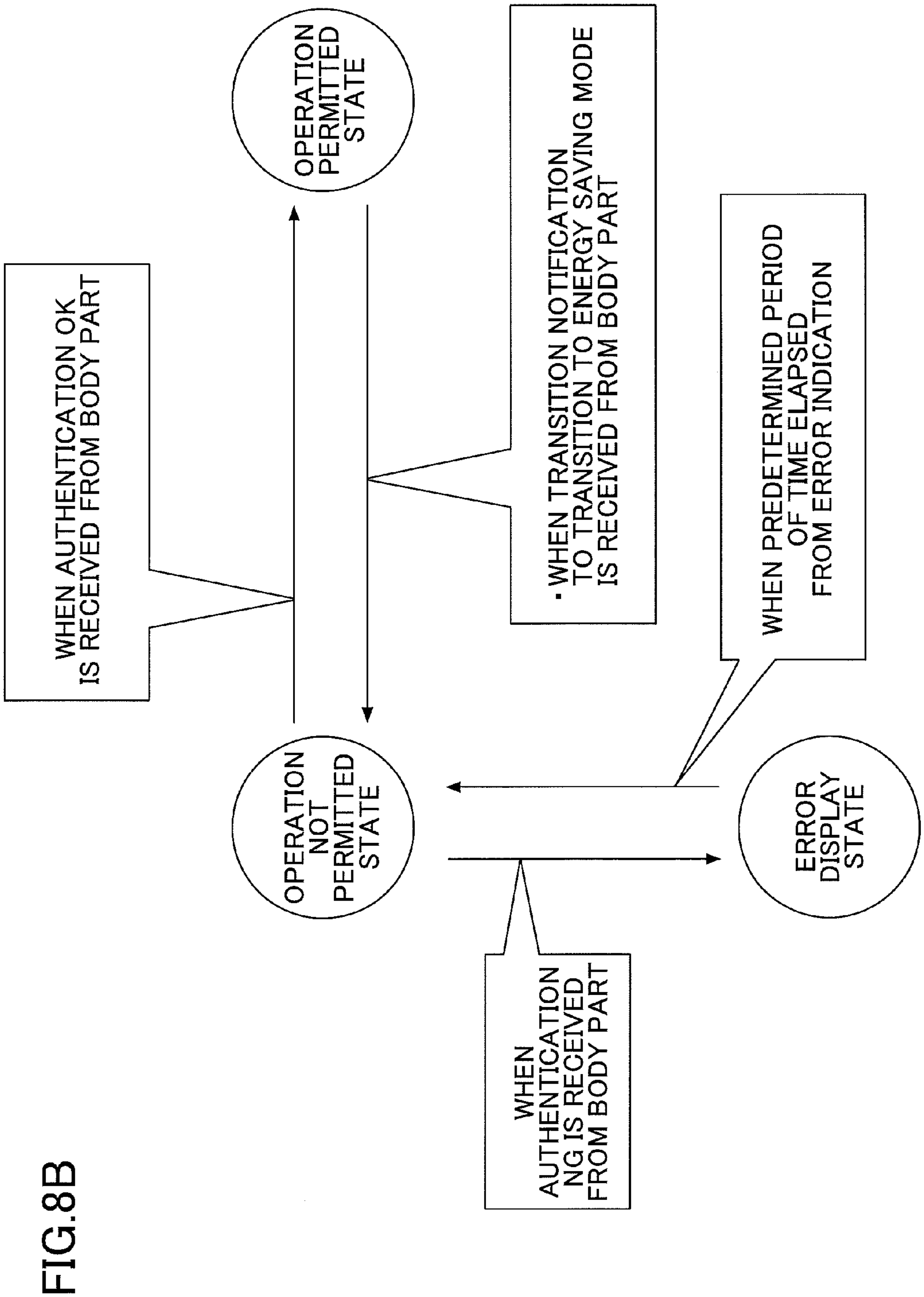

FIG. 8B illustrates switching between the operation permitted state and the operation not permitted state controlled by the operation part control service 474 of the operation part 120. As shown in FIG. 8B, a transition from the operation permitted state to the operation not permitted state is carried out when the operation part 120 receives from the body part 110 a transition notification indicating that a transition to the energy saving mode is carried out. Specifically, the operation part 120 carries out a transition to the operation not permitted state when the body part 110 carries out a transition to the energy saving mode as a result of carrying out a process and the operation part 120 receives from the body part 110 a transition notification indicating that the body part 110 thus carries out a transition to the energy saving mode.

On the other hand, a transition from the operation not permitted state to the operation permitted state is carried out when the operation part 120 receives from the body part 110 a notification indicating that user authentication is successful. Note that when, during the operation not permitted state, the operation part 120 receives from the body part 110 a notification indicating that user authentication has failed, the operation part 120 carries out a transition to an error display state of displaying a display screen page of an error message on the display and input part 500. Note that after a predetermined period of time elapses from when the display screen page of the error message is displayed, the operation part 120 returns to the operation not permitted state from the error display state.

<Flow of Mode Control Process>

Figure 9:
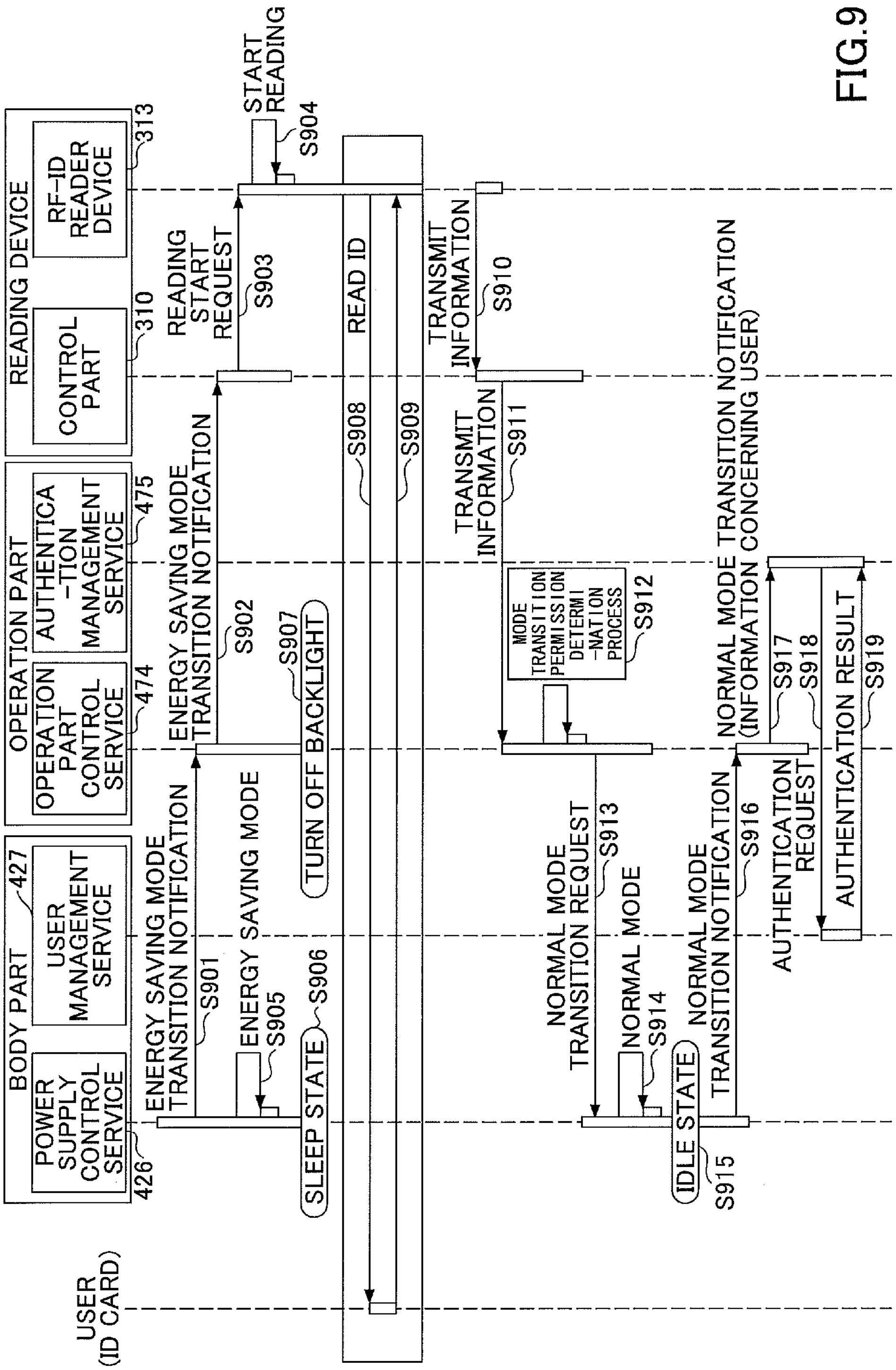
FIGS. 9 and 10 are sequence diagrams illustrating a flow of a mode control process in the image forming apparatus.
Figure 10:
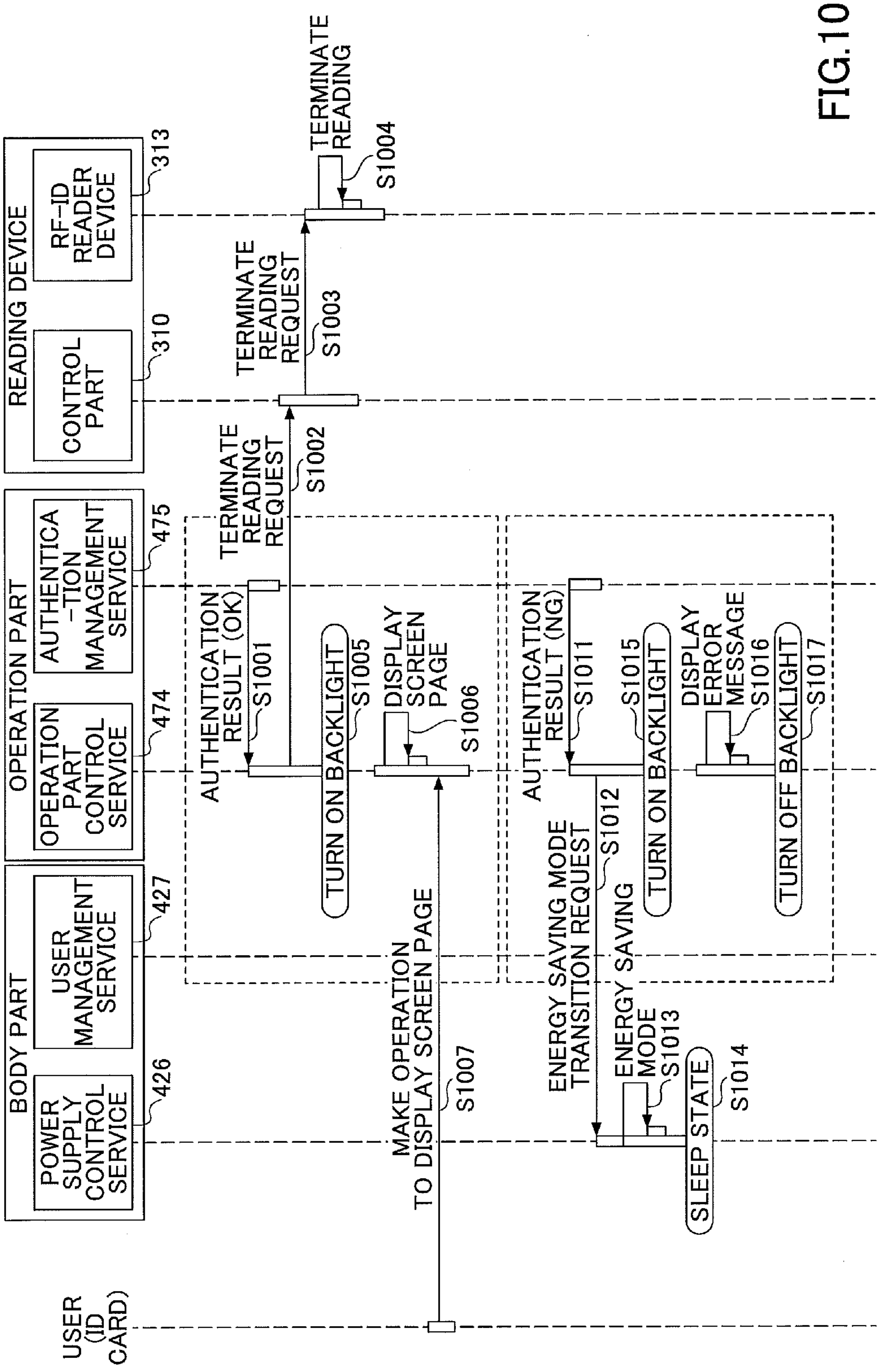

Next, a flow of the mode control process in the image forming apparatus 100 will be described. FIGS. 9 and 10 are sequence diagrams illustrating a flow of the mode control process in the image forming apparatus 100.

When the power supply control service 426 of the body part 110 determines that none of signals based on various operations performed by the user to the operation part 120 have been transmitted for the predetermined period of time, the power supply control service 426 of the body part 110 transmits a transition notification to transition to the energy saving mode (energy saving mode transition notification) to the operation part control service 474 of the operation part 120 (Step S901).

The operation part control service 474 that receives the energy saving mode transition notification transmits the received notification to the control part 310 of the reading device 130 (Step S902). When receiving the transmitted notification, the control part 310 of the reading device 130 transmits to the RF-ID reader device 313 a start request for a reading process (Step S903). The RF-ID reader device 313 that receives the transmitted start request starts a reading process accordingly (Step S904).

The power supply control service 426 that thus transmits the energy saving mode transition notification causes the body part 110 to carry out a transition to the energy saving mode (Step S905). Thereby, the body part 110 enters a sleep state (i.e., a state where the power supply to some of the hardware resources 402 is turned off) (Step S906). Similarly, the operation part control service 474 that thus receives the energy saving mode transition notification turns off the backlight 503 of the LCD device 501 included in the display and input part 500 of the user interface part 301 (Step S907).

The RF-ID reader device 313 that thus starts the reading process starts transmitting electro-magnetic waves at a predetermined period (Step S908). At this time, when a user who carries his or her IC card 140 approaches the image forming apparatus 100 at a position apart from the image forming apparatus 100 by a predetermined distance, the RF-ID tag provided in the IC card 140 receives the electro-magnetic waves. The RF-ID tag that thus receives the electro-magnetic waves transmits recorded information (information concerning the user) (Step S909).

As a result of the RF-ID reader device 313 receiving electro-magnetic waves thus transmitted by the RF-ID tag, the RF-ID reader device 313 detects the information concerning the user (the user ID and the group ID). The RF-ID reader device 313 transmits the detected information (the information concerning the user) to the control part 310 together with information concerning the signal strength of the signal acquired when thus reading (detecting) the information (Step S910).

The control part 310 transmits the information thus received from the RF-ID reader device 313 (the information concerning the user and the information concerning the signal strength) to the operation part control service 474 of the body part 110 (Step S911).

Based on the thus received information, the operation part control service 474 determines whether this user is a user who will use the image forming apparatus 100. Further, by reading the determination table (FIG. 6), the operation part control service 474 determines whether this user is a user having transition authority to transition to the normal mode. These determination processes are referred to as the "mode transition permission determination process" (Step S912). Details of the mode transition permission determination process (Step S912) will be described later.

It is assumed that, as a result of the mode transition permission determination process in Step S912, this user is determined as a user who will use the image forming apparatus 100 and has transition authority to transition to the normal mode transition. In this case, the operation part control service 474 of the operation part 120 transmits a transition request to transition to the normal mode to the power supply control service 426 of the body part 110 (Step S913).

When receiving the transition request to transition to the normal mode (normal mode transition request) from the operation part control service 474 of the operation part 120, the power supply control service 426 of the body part 110 causes the body part 110 to carry out a transition to the normal mode (Step S914). Thus, the body part 110 enters an idle state (where the power is supplied to the hardware resources 402) (Step S915).

Further, the power supply control service 426 transmits a normal mode transition notification indicating that the transition to the normal mode is completed to the operation part control service 474 of the operation part 120 (Step S916).

The operation part control service 474 that receives the normal mode transition notification transfers the received normal mode transition notification to the authentication management service 475 (Step S917). When thus transferring the normal mode transition notification to the authentication management service 475, the operation part control service 474 also transmits the information (the information concerning the user) already received when transmitting the normal mode transition request together.

The authentication management service 475 that thus receives the normal mode transition notification starts an authentication management process. Specifically, the authentication management service 475 provides an instruction to the user management service 427 of the body part 110 to carry out an authentication process for the user ID included in the information concerning the user (Step S918).

The user management service 427 that thus receives the instruction to carry out an authentication process (authentication request) reads the authentication table (FIG. 7), carries out an authentication process for the user ID, and also, determines the services concerning image processing for which the user having this user ID has use authority. The user management service 427 transmits the information indicating whether the authentication is successful and the information of the services concerning image processing for which the user having this user ID has use authority to the authentication management service 475 as an authentication result (Step S919).

FIG. 10 illustrates a process carried out after the authentication management service 475 thus receives the authentication result indicating that the authentication is successful. The authentication management service 475 then analyzes the received authentication result and determines whether the authentication is successful. When determining that the authentication is successful, the authentication management service 475 sends a notification indicating that the authentication is successful (authentication result (OK)) to the operation part control service 474 (Step S1001).

The operation part control service 474 transmits an instruction to the control part 310 of the reading device 130 to terminate the reading process (terminate reading request) (Step S1002). The control part 310 transmits an instruction to the RF-ID reader device 313 to terminate the reading process (terminate reading request) (Step S1003) and the RF-ID reader device 313 receives this termination instruction and terminates the reading process (Step S1004).

In parallel with the transmission of the termination instruction to the reading device 130, the operation part control service 474 turns on the backlight 502 (Step S1005). Also, the operation part control service 474 analyzes the received authentication result, determines a display screen page corresponding to the services for which the user has use authority and displays the thus determined display screen page (Step S1006).

Thus, in the user interface part 301, the backlight 503 is turned on and the display screen page showing the services concerning image processing for which the user has use authority is displayed. Then, the user gives operations to the thus displayed display screen page so as to provide an instruction to execute a service(s) concerning image processing (Step S1007).

On the other hand, when determining that the authentication is not successful by analyzing the received authentication result, the authentication management service 475 sends a notification indicating that the authentication is not successful (authentication result (NG)) to the operation part control service 474 (Step S1011).

The operation part control service 474 then transmits a transition request to transition to the energy saving mode (energy saving mode transition request) to the power supply control service 426 of the body part 110 (Step S1012). According to the transition request to transition to the energy saving mode thus received from the operation part control service 474, the power supply control service 426 of the body part 110 carries out a transition to the energy saving mode (Step S1013). Thus, the body part 110 enters the sleep state (Step S1014).

In parallel with the transmission of the transition request to transition to the energy saving mode to the power supply control service 426, the operation part control service 474 turns on the backlight 503 in the user interface part 301 of the operation part 120 (Step S1015). Further, the operation part control service 474 displays a display screen page on the user interface part 301 including a notification showing an error message (an error message indicating that the user has no use authority) (Step S1016).

When the error message is displayed for a predetermined period of time, the operation part control service 474 turns off the backlight 503 of the user interface part 301 (Step S1017).

<Flow of Mode Transition Permission Determination Process>

Figure 11:
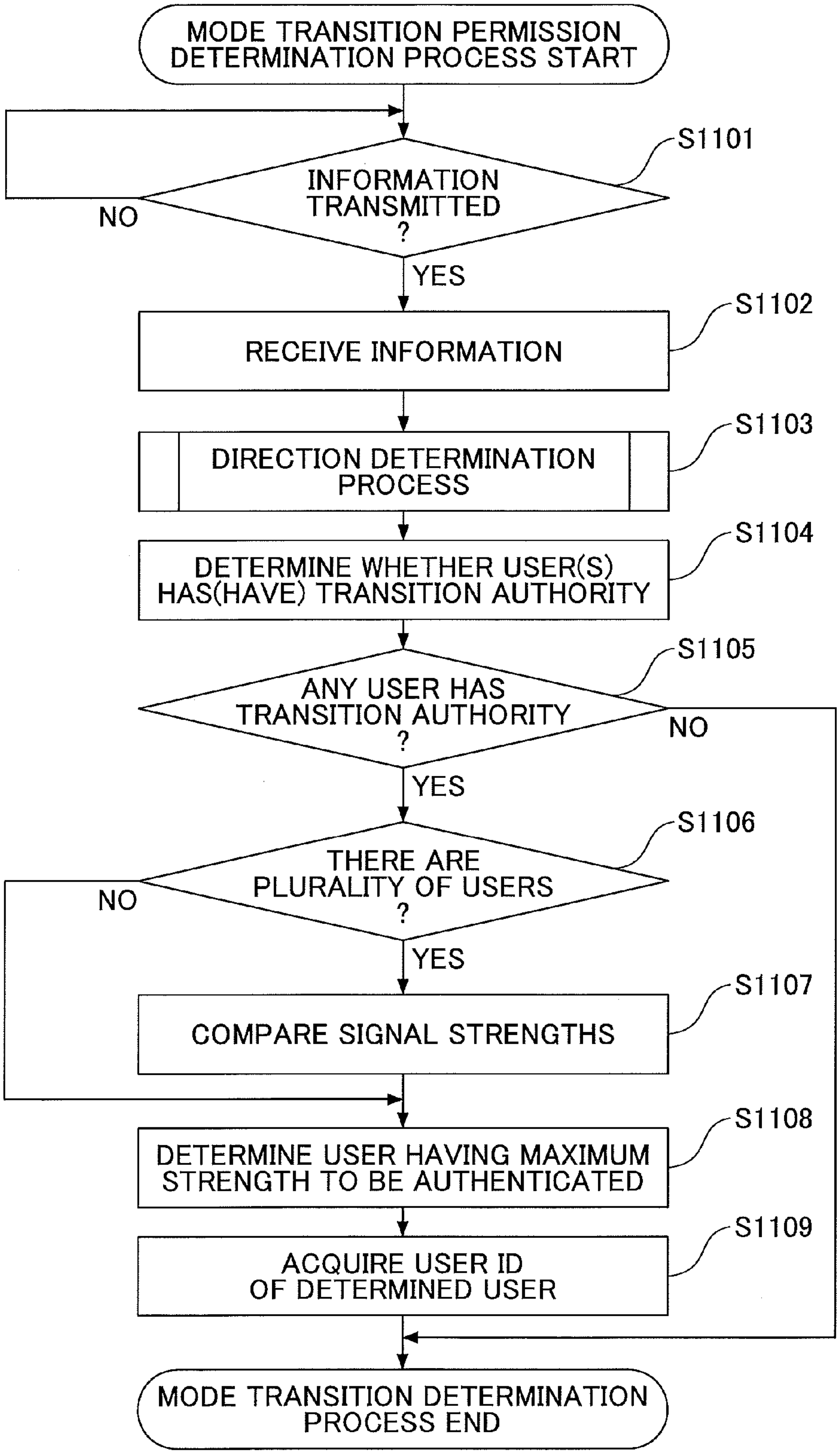
FIG. 11 is a flowchart illustrating a flow of the mode transition permission determination process in the operation part.

Next, details of the mode transition permission determination process (Step S912) in the mode control process of FIG. 9 will be described. FIG. 11 is a flowchart illustrating a flow of the mode transition permission determination process.

When thus receiving the transition notification to transition to the energy saving mode from the body part 110 and turning off the backlight 503 of the user interface part 301, the operation part control service 474 starts the mode transition permission determination process shown in FIG. 11.

In Step S1101, the operation part control service 474 determines whether the information concerning the user(s) and the information concerning the signal strength(s) are transmitted from the reading device 130. When determining that the information concerning the user(a) and the information concerning the signal strength(s) are not transmitted, the operation part control service 474 determines that there is no user near the image forming apparatus 100 and waits for these items of information to be transmitted from the reading device 130.

In Step S1101, when determining that the information concerning the user(s) and the information concerning the signal strength(s) are transmitted from the reading device 130, the operation part control service 474 determines that there is(are) a user(s) within a predetermined area from the image forming apparatus 100 and proceeds to Step S1102.

In Step S1102, the operation part control service 474 receives the information concerning the user(s) and the information concerning the signal strength(s) transmitted. In Step S1103, the operation part control service 474 determines whether the user(s) thus determined as being within the predetermined area from the image forming apparatus 100 moves(move) in a direction(s) approaching the image forming apparatus 100 or a direction(s) distancing himself or herself (themselves) from the image forming apparatus 100. That is, the operation part control service 474 carries out a direction determination process of determining the movement direction(s) of the user(s) (Step S1103, details of the direction determination process will be described later).

When determining that the user(s) is(are) moving in a direction(s) approaching the image forming apparatus 100 through the direction determination process in Step S1103, the operation part control service 474 determines that this user(s) will use the image forming apparatus 100. Then, the operation part control service 474 determines this user(s) as a user(s) for whom it is to be determined whether he or she (they) is(are) permitted to perform a mode transition.

In Step S1104, the operation part control service 474 determines whether the user(s), determined in Step S1103 as a user(s) for whom it is to be determined whether he or she(they) is(are) permitted to perform a mode transition, has(have) transition authority to transition to the normal mode by reading the determination table (FIG. 6).

When determining in Step S1104 that none of all the users, each determined in Step S1103 as a user for whom it is to be determined whether he or she is permitted to perform a mode transition, has transition authority, the mode transition permission determination process is ended (NO in Step S1105). In this case, a transition to the normal mode is not carried out and the energy saving mode is continued.

On the other hand, when determining in Step S1104 that one or more users, each determined in Step S1103 as a user for whom it is to be determined whether he or she is permitted to perform a mode transition, have transition authority, the operation part control service 474 proceeds to Step S1106 (YES in Step S1105). In Step S1106, the operation part control service 474 determines whether the number of the users having transition authority is more than one.

When determining in Step S1106 that the number of the users having transition authority is more than one, the operation part control service 474 proceeds to Step S1107. In Step S1107, the operation part control service 474 compares the respective signal strengths of these users.

In Step S1108, the operation part control service 474 determines, based on the comparison result of Step S1107, the one of the users moving in directions approaching the image forming apparatus 100 who is determined as moving in a direction approaching the image forming apparatus 100 in the earliest timing and has the maximum signal strength as a user to be authenticated. On the other hand, when determining in Step S1106 that the number of the users having transition authority is only one, the operation part control service 474 determines this user having transition authority as a user to be authenticated in Step S1108.

In Step S1109, the operation part control service 474 acquires the user ID of the user determined in Step S1108 and finishes the process. The user ID acquired in Step S1109 is included in the normal mode transition notification which is transmitted to the authentication management service 475 in Step S917 of FIG. 9.

<Flow of Direction Determination Process>

Figure 12:
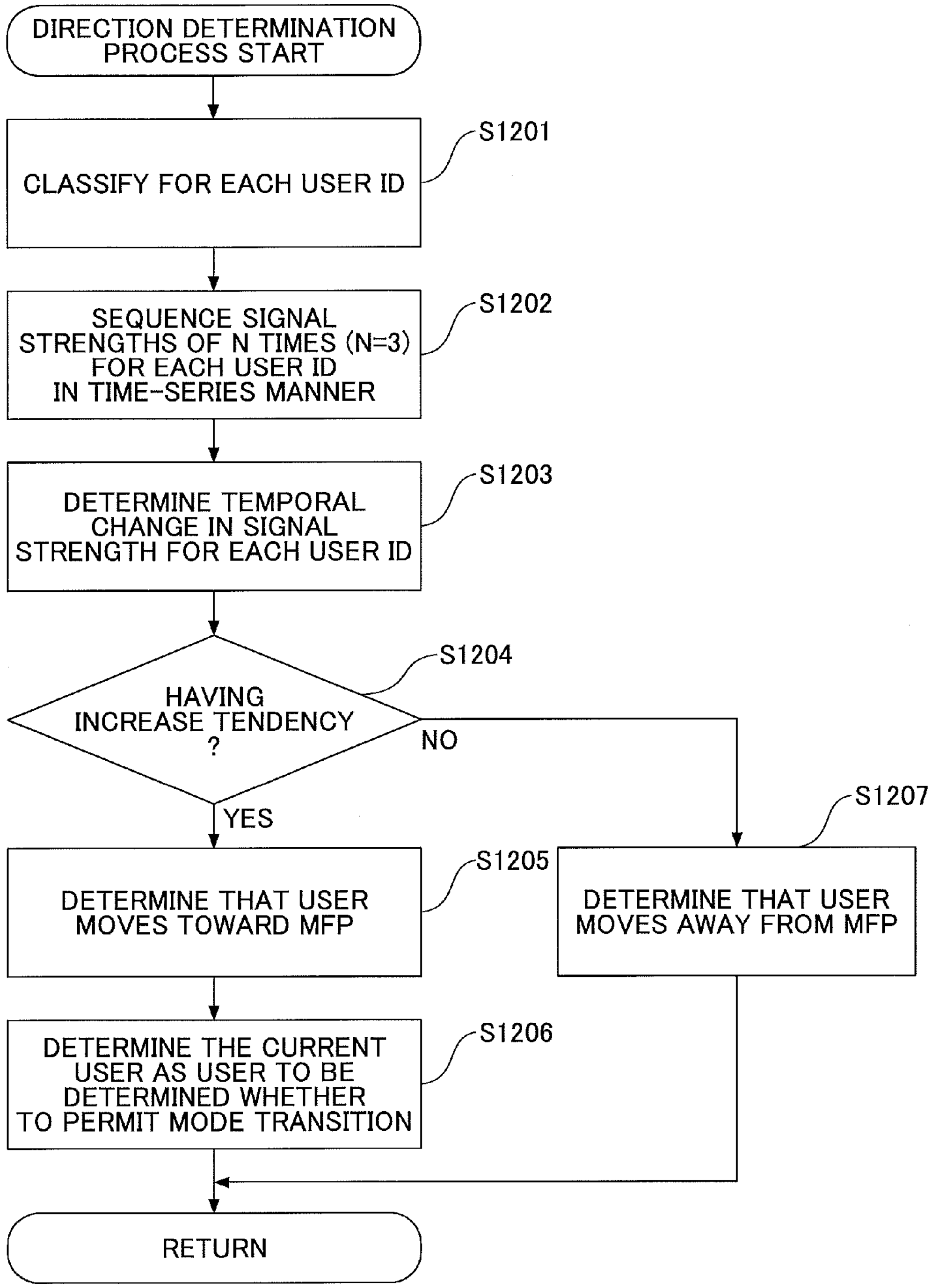
FIG. 12 is a flowchart illustrating a flow of a direction determination process in the operation part.

Next, a flow of the direction determination process (Step S1103) in the mode transition determination process of FIG. 11 will be described in detail. FIG. 12 is a flowchart illustrating a flow of the direction determination process. When receiving the information concerning the user and the information concerning the signal strength transmitted from the reading device 130, the operation part control service 474 starts the direction determination process shown in FIG. 12.

In Step S1201, the operation part control service 474 classifies the received information concerning the signal strengths for the respective user IDs included in the information concerning the users, and, for each user ID, sequences the respective signal strengths for the N times of received signals (for example N=3) in a time-series manner according to the received timings. FIGS. 13A-13D illustrate the signal strengths for the 3 times of receptions classified for the respective user IDs included in the information concerning the users and sequenced in a time-series manner according to the received timings.

Figure 13A:
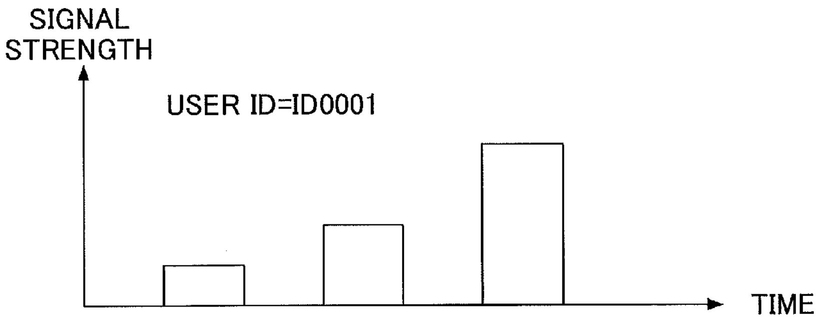
FIGS. 13A-13D illustrate examples of signal strengths of signals detected in the reading device.
Figure 13B:
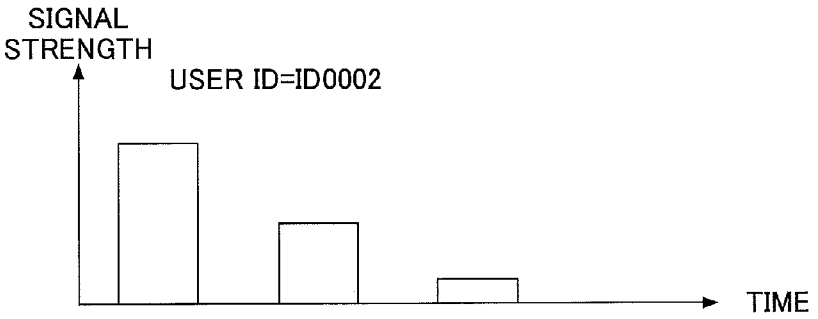
Figure 13C:
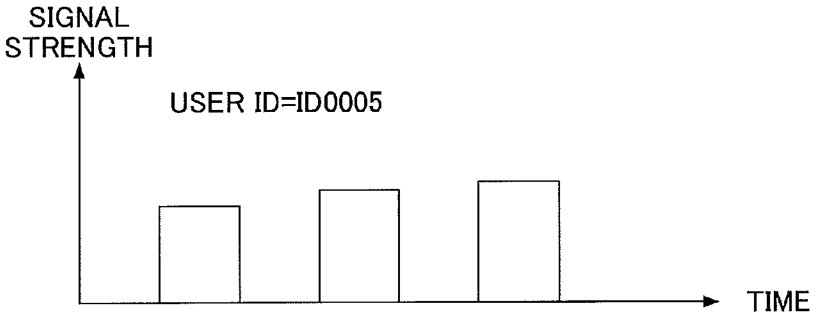
Figure 13D:
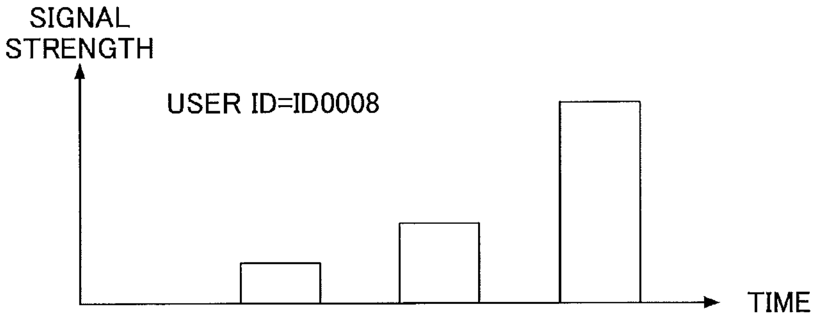

FIG. 13A illustrates the signal strengths for the 3 times of the received signals having the user ID=ID0001 sequenced in a time-series manner according to the received timings. Similarly, FIG. 13B illustrates the signal strengths for the 3 times of the received signals having the user ID=ID0002 sequenced in a time-series manner according to the received timings. FIG. 13C illustrates the signal strengths for the 3 times of the received signals having the user ID=ID0005 sequenced in a time-series manner according to the received timings. FIG. 13D illustrates the signal strengths for the 3 times of the received signals having the user ID=ID0008 sequenced in a time-series manner according to the received timings.

In Step S1203, the operation part control service 474 determines the temporal change of the signal strength for each user ID. When determining that the signal strength has an increasing tendency, the operation part control service 474 proceeds from Step S1204 to Step S1205. In Step S1205, the operation part control service 474 determines that the user corresponding to this user ID is moving in a direction approaching the image forming apparatus 100 and will use the image forming apparatus 100. In Step S1206, the operation part control service 474 determines this user as a user for whom it is to be determined whether he or she is permitted to perform a mode transition.

On the other hand, when determining that the signal strength has a decreasing tendency, the operation part control service 474 proceeds from Step S1204 to Step S1207. In Step S1207, the operation part control service 474 determines that the user corresponding to this user ID is moving in a direction distancing himself or herself from the image forming apparatus 100 and will not use the image forming apparatus 100.

In the example of FIGS. 13A-13D, the operation part control service 474 determines the users having the user IDs, i.e., ID0001, ID0005 and ID0008, as users who are moving in directions approaching the image forming apparatus 100 and for whom it is to be determined whether they are permitted to perform a mode transition. On the other hand, the operation part control service 474 determines the user having the user ID, i.e., ID0002, as a user who is moving in a direction distancing himself or herself from the image forming apparatus 100 and is excluded from those for whom it is to be determined whether they are permitted to perform a mode transition.

In the example of FIGS. 13A-13D, any one of the users having the user IDs, i.e., ID0001, ID0005 and ID0008 has transition authority to transition to the normal mode (see FIG. 6). Further, the users having the user IDs, i.e., ID0001 and D0005 have the same timing of being determined as moving in a direction approaching the image forming apparatus 100 (the signal received timings of the third receptions are the same). On the other hand, the user having the user ID, i.e., ID0008 has the signal received timing of the third reception later than the users having the user IDs, i.e., ID0001 and ID0005. Therefore, the user having the user ID, i.e., ID0008, is excluded from those to be authenticated.

Further, when the signal strengths of the users having the user IDs, i.e., ID0001 and ID0005 are compared, it is seen that the signal strength of the user ID, i.e., ID0001 is greater than the user ID, i.e., ID0005. Therefore, finally, the user of the user ID, i.e., ID0001, is determined as one to be authenticated.

<Examples of Mode Control Process>

Figure 14A:
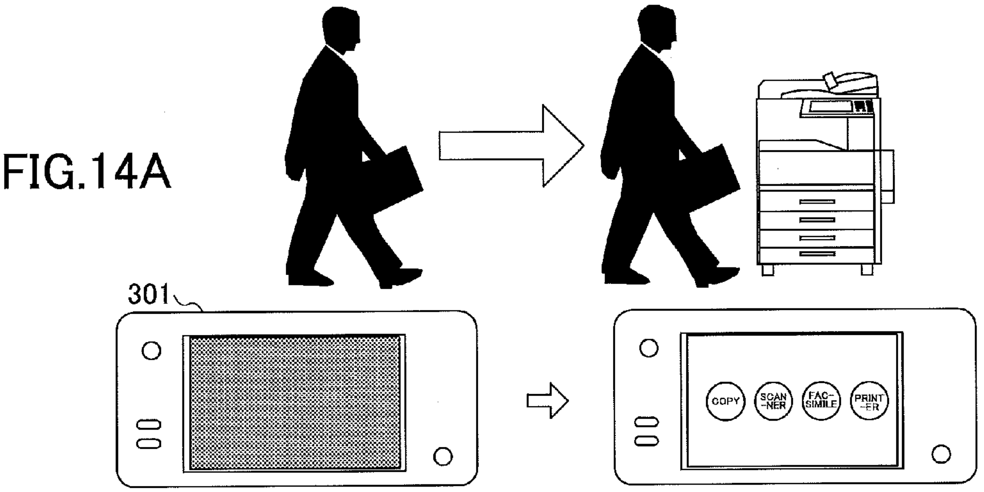
FIGS. 14A-14C illustrate examples of display screen pages displayed on the operation part when the mode control process is carried out.
Figure 14B:
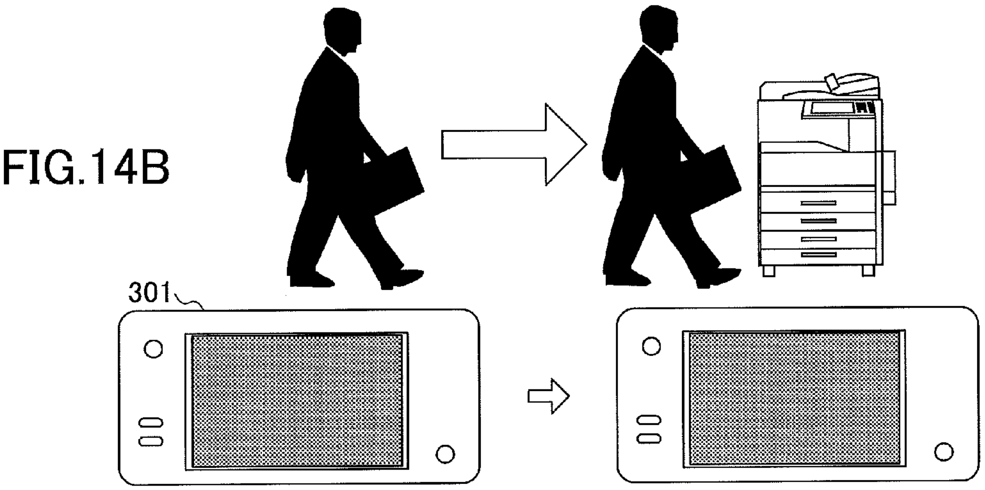
Figure 14C:
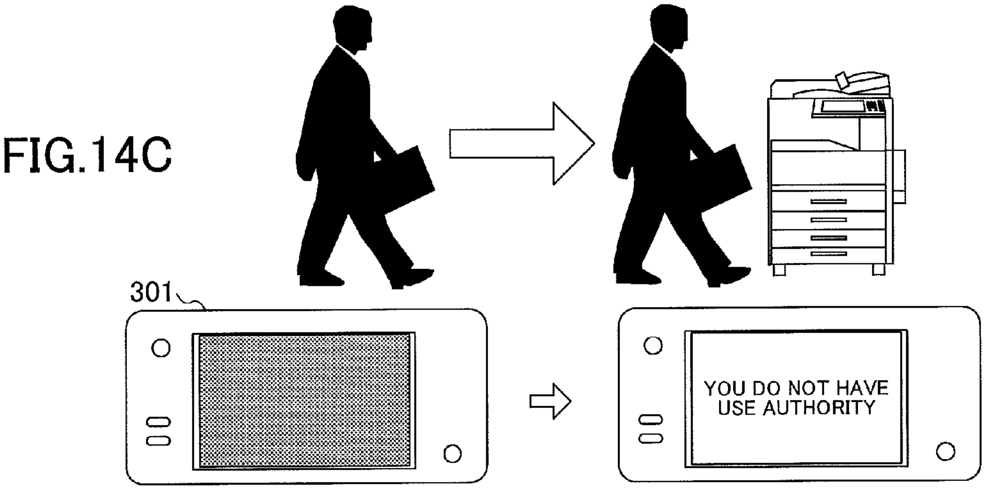

Next, examples of the mode control process will be described. FIGS. 14A-14C illustrate examples of the mode control process described using FIGS. 9 and 10. In any case of FIGS. 14A-14C, a user moves in a direction approaching the image forming apparatus 100 in the energy saving mode.

Thereamong, FIG. 14A illustrates a case where a user who is approaching the image forming apparatus 100 has transition authority to transition to the normal mode and also has use authority for the image forming apparatus 100. As shown in FIG. 14A, in a state where the user is at a position apart from the image forming apparatus 100 by a certain distance, the backlight 503 in the display and input part 500 of the user interface part 301 is in a turned-off state and the display and input part 500 does not accept the user's operation. In contrast thereto, when this user approaches the image forming apparatus 100, the backlight 503 in the display and input part 500 is turned on, and a display screen page is displayed there. As a result, the user is free from waiting for a retuning period of time to transition from the energy saving mode to the normal mode and can immediately cause the image forming apparatus 100 to carry out a service concerning image processing.

FIG. 14B illustrates a case where a user who is approaching the image forming apparatus 100 does not have transition authority to transition to the normal mode. As shown in FIG. 14B, in a state where the user is at a position apart from the image forming apparatus 100 by a certain distance, the backlight 503 in the display and input part 500 of the user interface part 301 is in a turned-off state and the display and input part 500 does not accept the user's operation. Also, even when this user approaches the image forming apparatus 100, the backlight 503 in the display and input part 500 is kept turned off and the input part 500 still does not accept the user's operation. Thus, the energy saving mode is maintained and the energy saving effect is kept unreduced.

FIG. 14C illustrates a case where a user who is approaching the image forming apparatus 100 has transition authority to the normal mode but does not have use authority for the image forming apparatus 100. As shown in FIG. 14C, in a state where the user is at a position apart from the image forming apparatus 100 by a certain distance, the backlight 503 in the display and input part 500 of the user interface part 301 is in a turned-off state and the display and input part 500 does not accept the user's operation. In contrast thereto, when this user approaches the image forming apparatus 100, the backlight 503 in the display and input part 500 is turned on, and a display screen page of an error message is displayed there. As a result, the user can see that he or she does not have use authority for the image forming apparatus 100.

Summary of Embodiment

As can be clearly seen from the above description, according to the present embodiment, the reading device is provided in the image forming apparatus and reads the information recorded in the RF-ID tag included in the IC card carried by the user.

Also, based on the signal strength acquired at the time of reading, the user who will use the image forming apparatus is identified.

Also, it is determined whether the thus identified user has transition authority to cause the image forming apparatus in the energy saving mode to carry out a transition to the normal mode based on the information recorded in the RF-ID tag. Further, when it is determined that the identified user has the transition authority, it is then determined whether this user has use authority to use the image forming apparatus.

When this user has the transition authority and also has the use authority, the image forming apparatus is caused to carry out a transition from the energy saving mode to the normal mode, and also, the display screen page corresponding to this user is displayed on the operation part.

Thereby, this user can perform an operation to cause the image forming apparatus to carry out a desired service concerning image processing immediately when reaching the image forming apparatus. As a result, it is possible to improve convenience in the user's operation.

Further, according to the present embodiment, when it is determined that the user will not use the image forming apparatus, the image forming apparatus is not caused to carry out a transition from the energy saving mode to the normal mode.

Also, even when it is determined that the user will use the image forming apparatus, the image forming apparatus is not caused to carry out a transition from the energy saving mode to the normal mode when this user does not have the transition authority.

Further, when this user has the transition authority but does not have the use authority, the image forming apparatus is caused to merely display an error message and is immediately caused to return to the energy saving mode.

Thereby, it is possible to avoid a reduction in the energy saving effect which may otherwise occur due to the user who will not (or is not permitted to) use the image forming apparatus.

Second Embodiment

According to the above-mentioned first embodiment, when an authentication process is successful, a reading process by the reading device 130 is terminated in an interlocking manner. However, the present invention is not limited thereto. For example, such a configuration can also be provided that, even when an authentication process is successful, a reading process by the reading device 130 is continued.

By providing such a configuration, when a user for whom an authentication process is successful finishes his or her operations and goes away from the image forming apparatus 100, this can be detected. When the fact that the user goes away from the image forming apparatus 100 is thus detected, it is possible to carry out control such that the operation part 120 carries out a transition to the operation not permitted state.

Third Embodiment

In the above-mentioned first embodiment, a process carried out after a user for whom an authentication process is successful inputs an instruction to carry out a service concerning image processing (Step S1007) is not particularly described. However, such a configuration can be provided that after the user inputs an instruction to carry out a service concerning image processing, the user inputs a finish instruction, for example. Furthermore, such a configuration can be provided that, when the finish instruction is input, the backlight 503 is caused to be turned off, and a transition is caused to be carried out to the operation not permitted state.

In this case, when a subsequent user approaches the image forming apparatus 100, Steps S908 of FIG. 9 to Step S1006 of FIG. 10 (however, Steps S912-S916 are excluded) are executed, and a display screen page corresponding to the subsequent user is displayed.

Thus, in a state where the body part 110 is kept in the normal mode, an authentication process is carried out for the subsequent user. Then, when the authentication process is successful, the display screen page corresponding to the subsequent user is newly displayed. When the authentication process is not successful, Steps S1011-S1017 of FIG. 10 are executed.

Fourth Embodiment

According to the above-mentioned first embodiment, when an authentication process is not successful, a transition to the energy saving mode is carried out. However, the present invention is not limited thereto. A configuration can also be provided such that also in this case, the normal mode is maintained. In this case, when a subsequent user approaches the image forming apparatus 100, Steps S908 of FIG. 9 to Step S1006 of FIG. 10 (however, Steps S912-S916 are excluded) are executed, and a display screen page corresponding to the subsequent user is displayed.

Thus, in a state where the body part 110 is kept in the normal mode, an authentication process is carried out for the subsequent user. Then, when the authentication process is successful, the display screen page corresponding to the subsequent user is newly displayed.

Fifth Embodiment

According to the above-mentioned first embodiment, the backlight 503 in the display and input part 500 of the user interface part 301 is not turned on when the user does not have the transition authority. However, the present invention is not limited thereto. For example, such a configuration can also be provided that, in the same way as a case where the user has the use authority, the backlight 503 is turned on and an error message is displayed. Further, it is also possible to provide a configuration such that one mode of not turning on the backlight 503 when the user does not have the transition authority and another mode of turning on the backlight 503 and display an error message when the user does not have the transition authority are prepared, and these modes can be switched therebetween.

Further, according to the above-mentioned first embodiment, an authentication process is not carried out when the user does not have the transition authority. However, the present invention is not limited thereto. For example, such a configuration can also be provided that an authentication process is caused to be carried out even when the user does not have the transition authority. Thereby, when an error message is displayed, it is possible to display whether the user has the transition authority in addition to displaying whether the user has the use authority.

According to the above-mentioned first embodiment, in order to determine a user to be authenticated, the user who is first determined as moving in a direction approaching the image forming apparatus and has the greatest signal strength is selected. However, a method of determining a user to be authenticated is not limited thereto.

According to the above-mentioned first embodiment, it is determined whether the user has the transition authority based on the user ID read out from the IC card. However, the present invention is not limited thereto. For example, such a configuration can also be provided that it is determined whether the user has the transition authority based on the group ID read out from the IC card.

According to the above-mentioned first embodiment, the operation part 120 and the reading device 130 are connected by wireless communication. However, the present invention is not limited thereto. The operation part 120 and the reading device 130 can be connected by wired communication.

In each of the above-mentioned embodiments, the RF-ID reader device 313 is provided inside the reading device 130. However, the present invention is not limited thereto. For example, the RF-ID reader device 313 can be provided inside the image forming apparatus 100 (inside the body part 110 or inside the operation part 120). Note that it is assumed that reading of the RF-ID tag by the RF-ID reader device 313 can be carried out even remotely.

Thus, the information processing apparatuses, the information processing methods and the non-transitory computer readable information recording media have been described by the embodiments. However, the present invention is not limited to the specifically disclosed embodiments, and any other variations and modifications may be made without departing from the scope of the present invention.

The present application is based on and claims the benefit of priority of Japanese Priority Application No. 2013-237750 filed Nov. 18, 2013 and Japanese Priority Application No. 2014-088076 filed Apr. 22, 2014, the entire contents of which are hereby incorporated herein by reference.

What is claimed is:

1. An information processing unit connected to a power supply control part that controls a transition between an energy saving mode of reducing power consumption and a normal mode of carrying out information processing and controlling a user interface part provided for carrying out an operation concerning the information processing, the information processing unit comprising:

a memory having computer readable instructions stored thereon; and at least one processor configured to execute the computer readable instructions to, determine, when receiving information through a reading process from a plurality of IC cards by a IC card reader, whether a plurality of users, each user associated with a respective IC card, identified by the information has transition authority for a transition from the energy saving mode to the normal mode, the information includes user identification information for identifying the plurality of users, image processing service information that identifies the image processing services that each of the users are authorized to use, and information concerning a signal strength of a signal received by the IC card reader related to each of the plurality of IC cards at the time of the reading process;

send a transition request for carrying out a transition from the energy saving mode to the normal mode to the power supply control part based on the determination result that at least one of the plurality of users has the transition authority;

carry out a transition to the normal mode in response to the transition request and, when authentication of the determined user is successful, display on the user interface part a display screen page for receiving an operation concerning the information processing, the display screen page displaying the image processing services that the determined user is authorized to use and not displaying the image processing services that the determined user is not authorized to use; and determine, when there are a plurality of users determined to have the transition authorities, the one user having the highest signal strength based on the information concerning the signal strengths of the respective users, and only authenticate the user determined to have the highest signal strength of the plurality of users determined to have the transition authorities, and display, when authentication of the thus determined user is successful, on the user interface part the display screen page for receiving the operation concerning the information processing, the display screen page displaying the image processing services that the thus determined user is authorized to use and not displaying the image processing services that the thus determined user is not authorized to use.

2. The information processing unit as claimed in claim 1, wherein the at least one processor is further configured to acquire a temporal change in the signal strength of the user based on the information concerning the signal strength, and, when the signal strength of the user increases, carry out determination as to whether the user has the transition authority.

3. The information processing unit as claimed in claim 1, wherein the information includes group identification information for identifying a group to which the user belongs, and the at least one processor is configured to carry out determination as to whether the user has the transition authority for carrying out the transition from the energy saving mode to the normal mode based on the group identification information.

4. The information processing unit as claimed in claim 1, wherein the at least one processor is configured to turn on a backlight that the user interface part has and display the display screen page.

5. The information processing unit as claimed in claim 1, wherein the at least one processor is configured to provide an instruction to start the reading process when the transition to the energy saving mode is carried out and provide an instruction to terminate the reading process when authentication of the user becomes successful.

6. The information processing unit as claimed in claim 2, wherein the at least one processor is configured to further acquire the temporal change of the signal strength of the user for whom the authentication is successful, and terminate displaying the display screen page when the signal strength of the user for whom the authentication is successful decreases.

7. The information processing unit as claimed in claim 1, wherein when authentication of the user is not successful, the at least one processor is configured to display on the user interface part a display screen page of an error message for a desired time period and thereafter terminate the displaying.

8. An information processing method in an information processing unit connected with a power supply control part that controls a transition between an energy saving mode of reducing power consumption and a normal mode of carrying out information processing and controlling a user interface part provided for carrying out an operation concerning the information processing, the information processing method comprising:

determining, when receiving information through a reading process from a plurality of IC cards by a IC card reader, whether a plurality of users, each user associated with a respective IC card, identified by the information has transition authority for a transition from the energy saving mode to the normal mode, which image processing services that each of the users are authorized to use, and a signal strength of a signal received by the IC card reader related to each of the plurality of IC cards at the time of the reading process;

sending a transition request for carrying out a transition from the energy saving mode to the normal mode to the power supply control part when it is determined in the determining that at least one of the plurality of users has the transition authority;

carrying out the transition to the normal mode in response to the transition request and, when authentication of the determined user is successful, displaying on the user interface part a display screen page for receiving an operation concerning the information processing, the displaying including displaying the image processing services that the determined user is authorized to use and not displaying the image processing services that the determined user is not authorized to use; and the determining including, when there are a plurality of users determined to have the transition authority, determining which of the plurality of users determined to have the transition authority has the highest signal strength, selecting the one user determined to have the highest signal strength of the plurality of users, and authenticating only the selected one user of the plurality of users.

9. A non-transitory computer readable information recording medium storing a program which when executed by one or more processors of an information processing unit connected with a power supply control part that controls a transition between an energy saving mode of reducing power consumption and a normal mode of carrying out information processing and controlling a user interface part provided for carrying out an operation concerning the information processing causes the one or more processors to carry out:

determining, when receiving information through a reading process from a plurality of IC cards by a IC card reader, whether a plurality of users, each user associated with a respective IC card, identified by the information has a transition authority for a transition from the energy saving mode to the normal mode, which image processing services that each of the users are authorized to use, and a signal strength of a signal received by the IC card reader related to each of the plurality of IC cards at the time of the reading process;

sending a transition request for carrying out a transition from the energy saving mode to the normal mode to the power supply control part when it is determined in the determining that at least one of the plurality of users has the transition authority;

carrying out the transition to the normal mode in response to the transition request and, when authentication of the determined user is successful, displaying on the user interface part a display screen page for receiving an operation concerning the information processing, the displaying including displaying the image processing services that the determined user is authorized to use and not displaying the image processing services that the determined user is not authorized to use; and the determining including, when there are a plurality of users determined to have the transition authority, determining which of the plurality of users determined to have the transition authority has the highest signal strength, selecting the one user determined to have the highest signal strength of the plurality of users, and authenticating only the selected one user of the plurality of users.

10. The non-transitory computer readable information recording medium as claimed in claim 9, wherein the determining includes, when it is determined that the plurality of users have the transition authorities, authenticating only the selected one user of the plurality of users.

* * * * *